US009792243B2

United States Patent
Blevins et al.

(10) Patent No.: US 9,792,243 B2
(45) Date of Patent: Oct. 17, 2017

(54) COMPUTER ARCHITECTURE TO PROVIDE FLEXIBILITY AND/OR SCALABILITY

(71) Applicant: Intel Corporation, Santa Clara, CA (US)

(72) Inventors: Dirk F. Blevins, Russell Springs, KY (US); John M. Morgan, Townsend, MA (US); Marc A. Goldschmidt, Scottsdale, AZ (US); Edward J. Pullin, Orefiled, PA (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 14/140,718

(22) Filed: Dec. 26, 2013

(65) Prior Publication Data
US 2015/0186319 A1   Jul. 2, 2015

(51) Int. Cl.
*G06F 15/00* (2006.01)
*G06F 7/48* (2006.01)
*G06F 13/40* (2006.01)
*G06F 13/20* (2006.01)

(52) U.S. Cl.
CPC .......... *G06F 13/4068* (2013.01); *G06F 13/20* (2013.01)

(58) Field of Classification Search
CPC ................ G06F 12/0813; G06F 1/183; G06F 2212/1048
See application file for complete search history.

(56) References Cited

U.S. PATENT DOCUMENTS

| 7,254,140 B1* | 8/2007 | Rokhsaz ............. H04L 12/5692 370/401 |
|---|---|---|
| 8,335,884 B2 | 12/2012 | Hamadani et al. |
| 2009/0070512 A1 | 3/2009 | Narad |
| 2011/0010481 A1 | 1/2011 | Hamadani et al. |
| 2011/0286691 A1* | 11/2011 | Hopkins .................. G02B 6/43 385/14 |
| 2013/0073766 A1 | 3/2013 | Gregg et al. |

(Continued)

FOREIGN PATENT DOCUMENTS

| CN | 101432706 A | 5/2009 |
|---|---|---|
| CN | 102893269 A | 1/2013 |

(Continued)

OTHER PUBLICATIONS

Office Action for Chinese Patent Application No. 201410822126.7, dated Aug. 8, 2017, 8 pages.

*Primary Examiner* — Hyun Nam
(74) *Attorney, Agent, or Firm* — Jordan IP Law, LLC

(57) ABSTRACT

Apparatus, systems, and/or methods may include a peripheral component interconnect express (PCIe) link to directly couple a slot with a network fabric. The slot may be defined by a surface and/or may accommodate a hardware module. A rack unit implementation may be utilized, such as a one rack unit (1 U) implementation, a four rack unit (4 U) implementation, and so on. The network fabric may be utilized when hardware modules communicate across the PCIe link, may be bypassed when hardware modules communicate across an additional PCIe link, and so on. The PCIe link may include a direct connect point-to-point PCIe link, a dual star PCIe link, and so on. In addition, the PCIe link may be utilized in a rack-scale architecture.

22 Claims, 10 Drawing Sheets

(56) References Cited

U.S. PATENT DOCUMENTS

2014/0355478 A1* 12/2014 Cha, II ............... H04L 41/0806
                                                             370/254
2015/0032286 A1*  1/2015 Balakrishnan ........ G06F 3/0611
                                                             700/300

FOREIGN PATENT DOCUMENTS

CN       103036817 A     4/2013
CN       103201724 A     7/2013

* cited by examiner

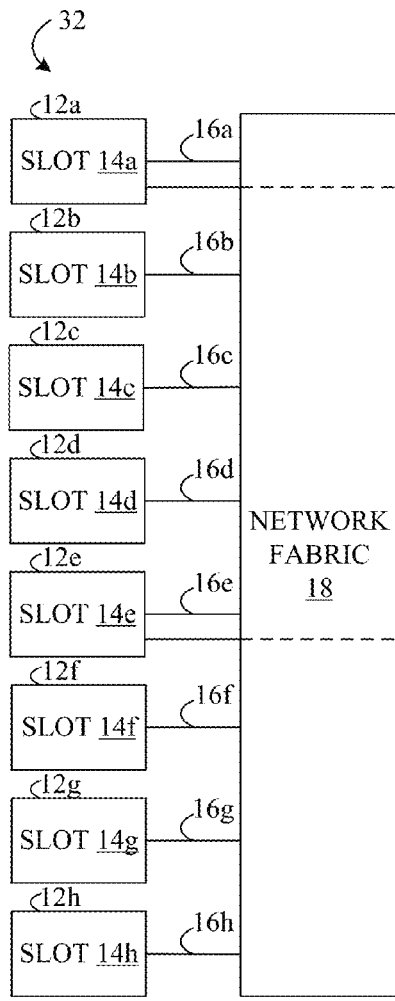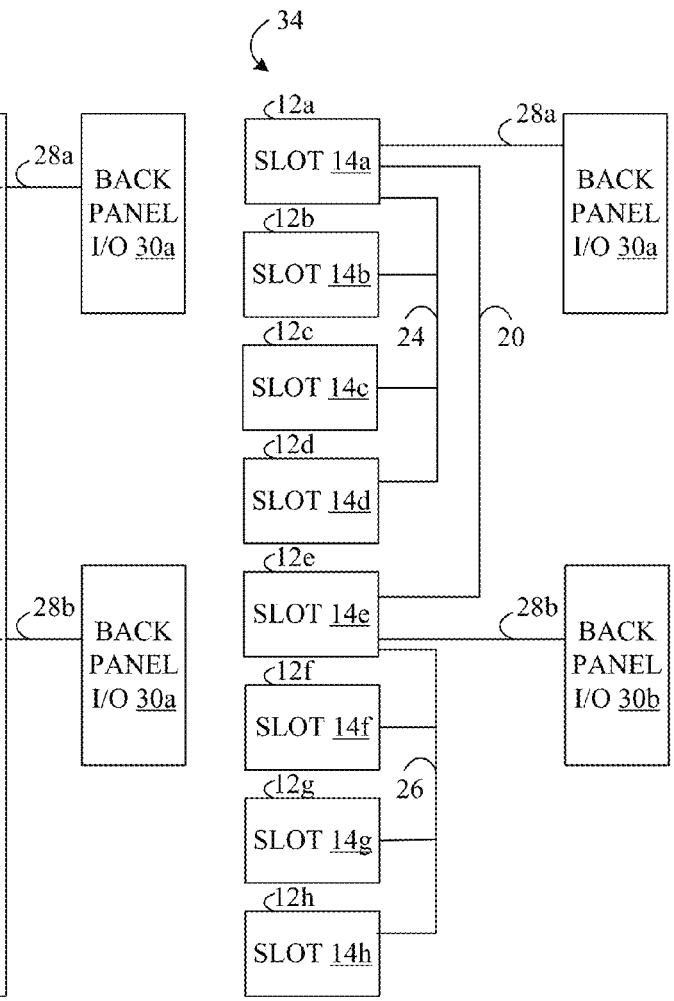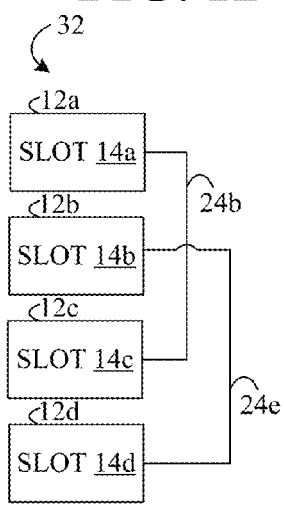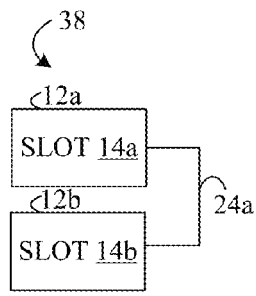
FIG. 1B
FIG. 1C
FIG. 1D
FIG. 1E

COMPUTER ARCHITECTURE TO PROVIDE FLEXIBILITY AND/OR SCALABILITY

BACKGROUND

Embodiments generally relate to a computer architecture. More particularly, embodiments relate to a computer architecture including a peripheral component interconnect express (PCIe) link directly coupling a slot, which may accommodate a hardware module, with one or more other slots, with a network fabric, and so on, or combinations thereof. The computer architecture may include a rack-scale architecture.

A conventional computer architecture may include proprietary and/or separate purpose built boxes that may be functionally inflexible, may be unscalable, may be vendor specific, may add cost, may waste space, and so on. In addition, the conventional architecture may include a purpose built top of rack (TOR) switch to implement workflows. Moreover, the conventional architecture may include cables (e.g., Fiber, copper, etc.) to couple the separate purpose built boxes with the TOR switch, which may add cost, limit bandwidth, increase complexity, and so on. Thus, for example, a data center and/or a service provider may be limited by bandwidth of links (e.g., 10 Gbps), by separate overlays interconnecting multiple fixed-functions, by existing deployments, by existing space, by cost, and so on, or combinations thereof.

BRIEF DESCRIPTION OF THE DRAWINGS

The various advantages of embodiments will become apparent to one skilled in the art by reading the following specification and appended claims, and by referencing the following drawings, in which:

FIGS. 1A to 1E are block diagrams of example rack-scale modular architectures according to an embodiment;

DETAILED DESCRIPTION

Figure 1A:
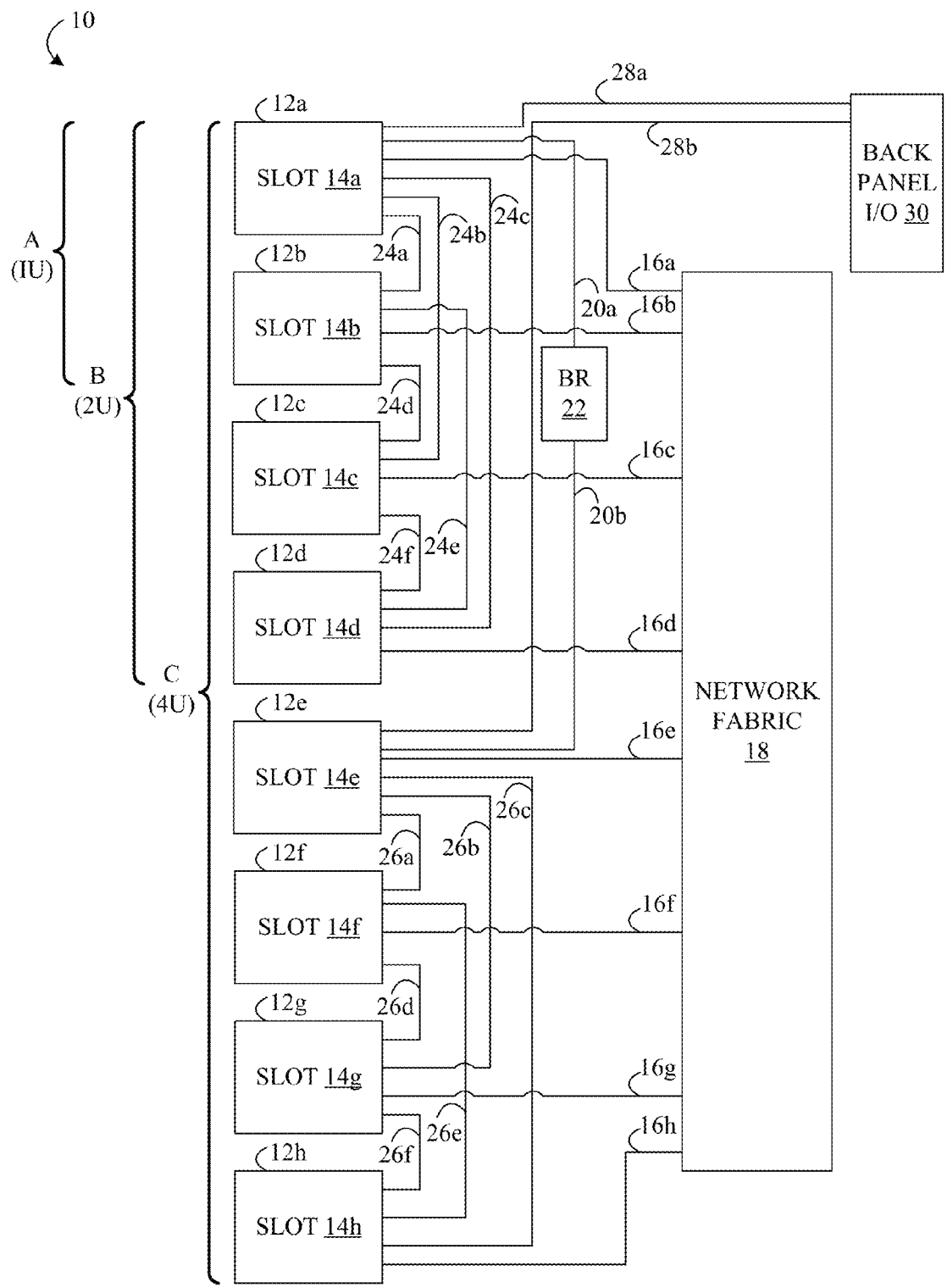

FIGS. 1A to 1D are block diagrams of example rack-scale modular architectures according to an embodiment. FIG. 1A shows a rack-scale modular architecture 10 including surfaces 12 (12a-12h) defining a slot 14 (14a-14h) to accommodate a hardware module. The hardware module may include any type of functionality such as, for example, compute functionality, storage functionality, security functionality, and so on, or combinations thereof. Thus, the hardware module may include a processor module, a storage module, a security module, a networking module, a switch module, a micro-server module, a peripheral component interconnect express (PCIe) module, a graphics module, a general purpose I/O card, and so on, or combinations thereof. It should be understood that any type of serial link may be utilized, and PCIe (e.g., Peripheral Components Interconnect/PCI Express Specification 3.0, PCI Special Interest Group) is described for illustration purposes.

The architecture 10 includes a PCIe link 16 (16a-16h) (e.g., a PCIe fabric) directly coupling each slot 14 (14a-14h) with a network fabric 18. The core of the network fabric 18 may be customized and/or differentiated as desired. In one example, the core of the network fabric 18 is Ethernet, and the network fabric 18 is an Ethernet switch. The core of the network fabric 18 may also include native support for a workflow, such as Network Function Virtualization (NFV), Open Flow (OF), Software Defined Networking (SDN), and so on, or combinations thereof. Thus, a hybrid fabric including a PCIe fabric and a network fabric may consolidate elements (e.g., compute, storage, security, etc.) to effectively eliminate the need for equipment (e.g., purpose built top of rack (TOR) switch), cabling (e.g., copper, Fiber, etc.), etc., by providing e.g., a backplane-based design which flexibly accommodates components and/or elements (e.g., removable hardware modules, network fabric, network security chips, etc.).

Notably, utilizing the PCIe link 16 (16a-16h) and/or the network fabric 18 may allow communication between each slot 14 (14a-14h) natively, without requiring a change to software. In one example, a respective hardware module (e.g., a processor module) may be accommodated at the slot 14a and a respective hardware module (e.g., a processor module) may be accommodated at the slot 14b, wherein the network fabric 18 is utilized when the respective hardware modules communicate natively with each other across the PCIe links 16a, 16b without requiring a change to software. In another example, a respective hardware module (e.g., a processor module) may be accommodated at the slot 14a and a respective hardware module (e.g., a processor module) may be accommodated at the slot 14e, wherein the network fabric 18 is bypassed when the respective hardware modules communicate natively with each other across an additional PCIe link 20 (20a-20b) directly coupling the slots 14a, 14e with, for example, a bridge 22. The bridge may be customized and/or differentiated as desired. In one example, the bridge may include a PCIe to Ethernet bridge. While a separate bridge may be positioned between any two of the slots 14 for direct communication, the bridge 22 may be utilized by any of the slots 14 to bypass the fabric 18 and directly communicate with each other.

The architecture 10 includes an additional PCIe link 24 (24a-24c). The additional PCIe link 24 (24a-24c) directly couples the slot 14a, which may accommodate a processor module, with the slots 14b-14d, which may accommodate an input/output (I/O) module such as, for example, a storage module. In one example, the storage module may include a solid state drive (SSD) module. Thus, the network fabric 18 is bypassed when the hardware module (e.g., a processor module) and the I/O module (e.g., the SSD module) communicate with each other across the PCIe link 24 (24a-24c). In addition, the architecture 10 includes an additional PCIe link 26 (26a-26c) directly coupling the slot 14e (e.g., accommodate a processor module) with the slots 14f-14h (e.g., accommodate an I/O module), wherein the network fabric 18 is bypassed when the hardware module (e.g., the processor module) and the I/O module (e.g., the SSD module) communicate with each other across the PCIe link 26 (26a-26c).

The architecture 10 includes a dual star (or full mesh) PCIe link directly coupling four of the slots 14 (14a-14d and 14e-14h) with each other. In the illustrated example of FIG. 1A, the dual star PCIe link directly coupling the slots 14a-14d with each other includes the PCIe links 24a-24c directly coupling the slot 14a with the slots 14b-14d, respectively, as well as PCIe links 24d, 24e directly coupling the slot 14b with the slots 14c, 14d, respectively, and a PCIe link 24f directly coupling the slots 14c and 14d. In addition, the dual star PCIe link directly coupling the slots 14e-14h with each other includes the PCIe links 26a-26c directly coupling the slot 14e with the slots 14b-14d, respectively, as well as PCIe links 26d, 26e directly coupling the slot 14e with the slots 14f, 14g, respectively, and a PCIe link 26f directly coupling the slots 14g and 14h. Thus, any slot 14 in a subsection (e.g., a two rack unit subsection) may provide direct communication utilizing a respective dual star PCIe link. Thus, the network fabric 18 is bypassed when a hardware modules communicates across the dual star PCIe links.

The architecture 10 includes an additional PCIe link 28 (28a-28b). The additional PCIe link 28 (28a-28b) directly couples the slots 14a, 14e with a back panel input/output (I/O) 30. In one example, the back panel I/O 30 includes a port such as, for example, a medium dependent interface (MDI) port (e.g., uplink port), an MDI crossover (MDIX) port, and so on. The back panel I/O may include, for example, a small form-factor pluggable (SFP) connector, a quad SFP (QSFP) connector, and so on, or combinations thereof. Thus, the network fabric 18 is bypassed when the hardware module (e.g., a processor module) communicates across the back panel I/O 30 utilizing the additional PCIe link 28.

While a direct attach point-to-point PCIe link from the slots 14a, 14e to the back panel I/O 30 is illustrated in FIG. 1A, the back panel I/O 30 may be directly attached with any of the slots 14 (14a-14h). In one example, each of the slots 14a-14h accommodate a respective processor module and are directly coupled with the I/O 30 via PCIe links 28a-28h, respectively. In addition, the fabric 18 may be directly connected with the back panel I/O 30 and/or may be utilized when the slots 14 (14a-14h) communicate across the back panel I/O 30 via, for example, the PCIe link 16 (16a-16h).

A scalable fabric (e.g., a scalable PCIe fabric, a scalable hybrid fabric) and/or a scalable rack-scale architecture may be utilized for customization and/or differentiation. For example, a rack unit (U) may include a measurement for an industry standard, such as a 19 inch rack specification, a 23 inch rack specification, an open rack specification, an open compute project (OCP) specification, and so on. In one example, a chassis may include a standard size to fit in a standard frame such as a 19 inch rack, wherein the width of the chassis may be up to approximately 19 inches, the height of the chassis may change in intervals of approximately 1.75 inches (1 U, 2 U, 3 U, 4 U . . . nU, where n may be 42 for a conventional industry standard), and the length of the chassis may be up to approximately 37 inches.

Thus, for example, a one rack unit (1 U) implementation A includes the two slots 14a, 14b to accommodate a respective hardware module that may not exceed a height of approximately 1.75 inches, a two rack unit (2 U) implementation B includes the four slots 14a-14d to accommodate a respective hardware module that may not exceed a height of approximately 3.5 inches, and a four rack unit (4 U) implementation C includes the eight slots 14a-14h to accommodate a respective hardware module that may not exceed a height of approximately 7.0 inches. In another example, a 1 U open rack implementation may include three modules aligned horizontally that may not exceed a height of approximately 1.75 inches based on an OCP specification. In a further example, a rack unit implementation, module, and/or chassis may be utilized independently of an industry standard. In addition, it should be understood that a unit implementation may be utilized for a non-rack implementation such as, for example, one or more slots for a non-rack mounted server, for a mobile computer platform, and so on.

The scalable fabric and/or the scalable rack-scale architecture may be utilized to provide flexible functionality. For example, a user may assemble a system based on a need (e.g., current need, future need, exact need, etc.). In addition, existing racks may not need to be removed and/or purchase, cables may not need to purchased and/or run, and so on, or combinations thereof. Moreover, space may be saved to provide the flexible functionality. Additionally, bandwidth may be scalable. For example, at PCIe 3.0, a PCIe link may provide approximately 8 gigabits per second (Gbps) in both directions, with a possibility of an additional 3 links per slot (e.g., per module) to provide scalable bandwidth in a scalable fabric.

The architecture 10 may include a user specific input/output (I/O) to provide user defined functionality. In one example, the user may dispose an element (e.g., chipset) including a specific I/O at a backboard to, for example, reduce the relative size of a processor module. The user may dispose storage (e.g., a hard drive) at a backboard to, for example, utilize a processor module to boot the architecture 10 across a PCIe link, a network fabric, and so on, or combinations thereof. The user may utilize an ejectable drive, which when inserted may utilize a PCIe link, a network fabric, and so on, or combinations thereof.

The architecture 10 may also include a management element to provide management functionality. For example, the user may dispose a management element at the backboard such as, for example, a thermal management element, a power management element, and so on, or combinations thereof. The user may dispose an error/failure element, such as a module error/failure element, a link error/failure element, a switch error/failure element, a bridge error/failure element, a port error/failure element, and so on, or combinations thereof. The user may dispose an element to configure logic, disable/enable components, and so on, or combinations thereof. Thus, the management element may utilize a PCIe link, a network fabric, and so on, or combinations thereof.

Any part of the architecture 10 may be flexibly configured. For example, FIG. 1B illustrate a rack-scale modular architecture 32 including the surfaces 12 (12a-12h) defining the slot 14 (14a-14h) to accommodate a hardware module and the PCIe link 16 (16a-16h) (e.g., a PCIe fabric) directly coupling each slot 14 (14a-14h) with the network fabric 18. The architecture 32 also includes the additional PCIe link 28a, 28b directly coupling the slots 14a, 14e with a back panel I/O 30a, 30b, respectively. The architecture 32 may be, for example, a compute server including a processor module accommodated at each of the slots 14a-14h. In the illustrated example of FIG. 1B, the network fabric 18 may be utilized when the processor modules communicate across the PCIe link 16 (16a-16b), and/or may be bypassed when the processor modules communicate across the additional PCIe links 28a, 28b. In addition, a non-transparent bridge (NTB) may be disposed between two slots to facilitate communication and avoid conflicts in a protocol (e.g., PCIe protocol).

The non-transparent bridge may be integral with a processor, integral with a fabric card, and so on, or combinations thereof.

FIG. 1C illustrates a rack-scale modular architecture 34 including the surfaces 12 (12a-12h) defining the slot 14 (14a-14h) to accommodate a hardware module and the PCIe link 20 directly coupling the slot 14a and the slot 14e. The PCIe link 20 may directly couple the slots 14a, 14e via a bridge. Thus, for example, the slots 14a-14b may be at a first tier of a 4 U implementation and the slots 14e-14h may be at a second tier of a 4 U implementation, wherein the bridge between the slot 14a and the slot 14e may be implemented to couple any of the slots 14a-14d with any of the slots 14e-14h across the two tiers. In another example, a separate bridge may be utilized between any the slots 14a-14h.

The architecture 34 also includes the additional PCIe link 24 directly coupling the slots 14a-14d with each other, and the additional PCIe link 26 directly coupling the slots 14e-14h with each other. The additional PCIe links 24, 26 may be utilized in any configuration, such as a set of direct connect point-to-point links between the slot 12a and the slots 12b-12d and a set between the slot 12e and the slots 12f-12h, a dual star PCIe links between the slots 12a-12d and a dual star PCIe link between the slots 12e-12f, and so on, or combinations thereof. In addition, architecture 34 includes the additional PCIe link 28 (28a-28b) directly coupling the slots 14a, 14e with the back panel I/O 30a, 30b, respectively. Thus, the network fabric 18 may be disabled, excluded, depopulated, and so on, or combinations thereof. Notably, the relative cost of the system may be reduced since the network fabric is not needed for the hardware modules to communication, to be utilized, and so on, or combinations thereof.

The architecture 34 may be utilized as a storage server including a respective processor module accommodated at the slots 14a, 14e that communicate with each other via the PCIe link 20, a respective storage module (e.g., an SSD module) accommodated at the slots 14b-14d that communicate with the processor module accommodated at the slot 14a utilizing the PCIe links 24, and a respective storage module (e.g., an SSD module) accommodated at the slots 14f-14h that communicate with the processor module accommodated at the slot 14e utilizing the PCIe links 26. In addition, mix and match functionality may be provided. Thus, for example, the architecture 34 may be readily changed from a storage server to a radio network controller (RNC) base station by removing storage module (e.g., an SSD module) at the slots 14b-14d and 14f-14h and inserting front end radio modules at the slots 14b-14d and 14f-14h. In another example, the modification may also be accomplished by enabling/disabling a link, a port, a card, and so on, or combinations thereof. The user may also depopulate the network fabric 18 to save cost when the implementation includes a storage server, and readily disassemble the architecture 34 as needed to install a PCIe fabric, network fabric, element, module, and so on, or combinations thereof.

FIG. 1D illustrates a rack-scale modular architecture 36 including the surfaces 12 (12a-12d) defining the slot 14 (14a-14d) to accommodate a hardware module and an additional PCIe link 24 (24b, 24e), wherein the PCIe link 24b directly couples the slot 14a with the slot 14c and the PCIe link 24e directly couples the slot 14b with the slot 14d. The slots 14c, 14d may accommodate the same module, such as a single double-wide open flow (OF)/SDN switch module including a network fabric (e.g., an Ethernet switch). It should be understood that larger modules may be accommodated such as, for example, a triple wide OF/SDN switch module for an open rack implementation. Thus, the architecture 36 may include a TOR switch wherein respective processor modules accommodated at the slots 14a, 14b communicate with the double-wide open OF/SDN switch module accommodated at the slots 14c, 14d utilizing the PCIe links 24b, 24e, respectively. Notably, no additional wires may be needed, and/or the TOR switch may be implemented from a same hardware module and/or chassis. In addition, a conventional TOR switch may be implemented.

FIG. 1E illustrates a rack-scale modular architecture 38 including the surfaces 12 (12a-12b) defining the slot 14 (14a-14b) to accommodate a hardware module and an additional PCIe link 24a to directly couple the slot 14a with the slot 14b. In one example, the PCIe link 24 may include more than one of the PCIe links (e.g., six) directly coupling the slot 14a with the slot 14b. In the illustrated example of FIG. 1E, the network fabric 18 and back panel I/O 30 may be depopulated. Thus, the architecture 38 may include security functionality wherein a processor module accommodated at the slot 14a communicates with a network security module accommodated at the slot 14b via the PCIe link 24a.

Accordingly, a flexible, interoperable, and/or scalable computer architecture may be provided. In a further example, the slot 14a may accommodate a processor module and each of seven remaining modules 14b-14h in e.g., a 4 U implementation may accommodate an I/O module, such as an SSD module. In addition, the slots 14a-14h may accommodate a respective I/O module (e.g., an SSD module) to provide storage functionality (e.g., a storage server) in e.g., a 4 U implementation, wherein a relatively high speed interconnect to PCIe converter (e.g., Ethernet to PCIe conversion) integral and/or coupled with one of the slots 14a-14h may provide communication between the storage server and another device.

Figure 2A:
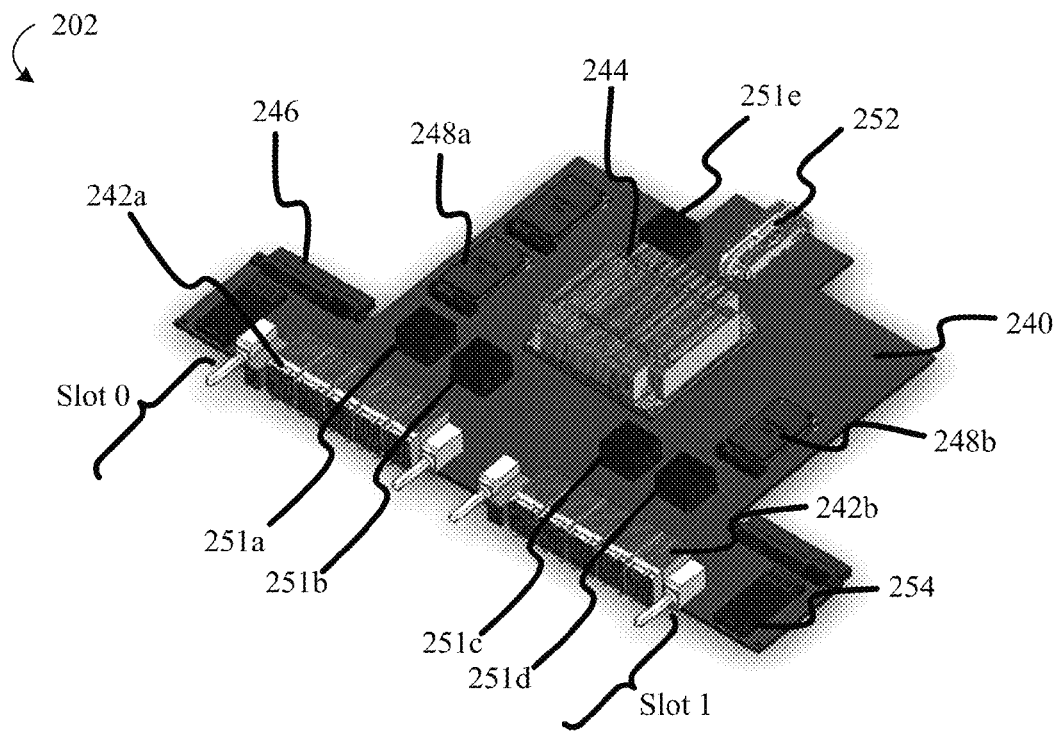
FIGS. 2A and 2B are perspective views of example backboard configurations according to an embodiment.
Figure 2B:
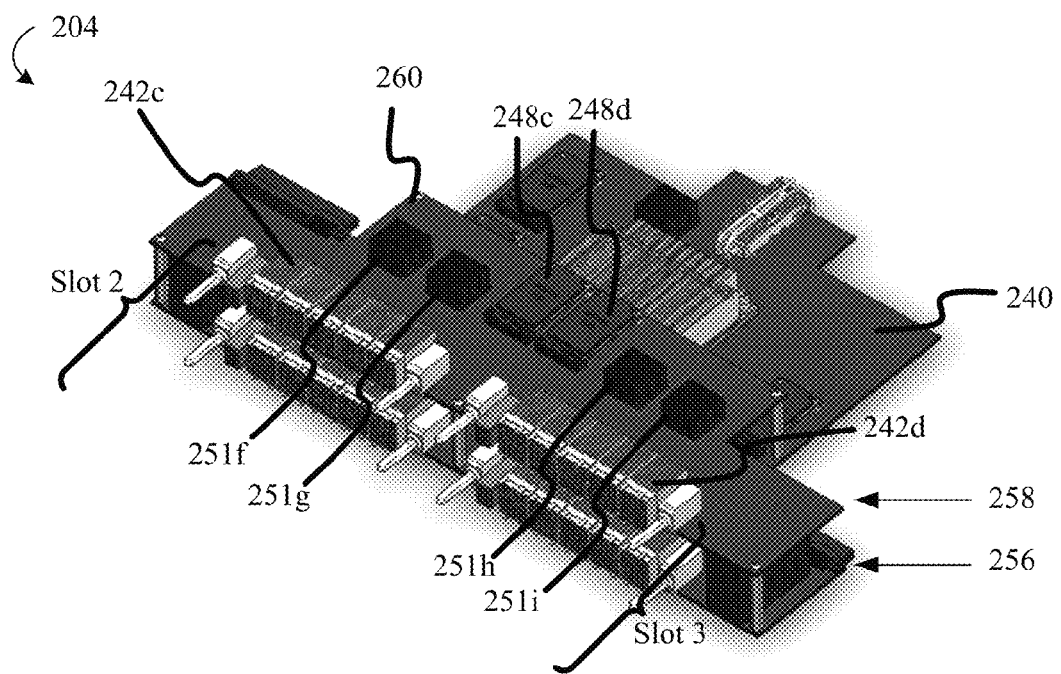

Turning now to FIGS. 2A and 2B, example backboard configurations are shown according to an embodiment. FIG. 2A shows a backboard configuration 202 including a dynamic function backboard 240. The backboard 240 includes a module interface 242 (242a-242b) to provide a PCIe link of a PCIe fabric for a 1 U implementation A (FIG. 1A), described above. The backboard 240 also includes a network fabric 244, such as the network fabric 18 (FIG. 1A), described above. Thus, a hardware module (e.g., a processor module) may be accommodated at slot 0 and a hardware module (e.g., an I/O module) may be accommodated at slot 1, wherein the network fabric 244 may be bypassed when the hardware modules communicate across a point-to-point PCIe link of the PCIe fabric directly coupling the slot 0 with the slot 1. In addition, the network fabric 244 may be utilized when a hardware module (e.g., a processor module) accommodated at the slot 0 communicates with a hardware module (e.g., a processor module) accommodated at the slot 1 across a respective PCIe link of the PCIe fabric directly coupling the slot 0 and the slot 1 with the network fabric 244.

The backboard 240 includes a power interface 246, such as a +12V DC interface, to provide power to a hardware module, to element of the backboard, and so on, or combinations thereof. In addition, the backboard 240 includes a storage element 248 (248a-248b) such as, for example, a micro-serial advanced technology attachment solid state drive (mSATA SSD). Thus, the hardware module accommodated at the slot 0 may be booted using mSATA SSD 248a while the hardware module accommodated at the slot 1 may be booted using mSATA SSD 248b. The backboard 240 also includes a protocol controller 251 (251a-251e) such as, for example, a gigabit Ethernet controller which may be disposed between the PCIe fabric and the network fabric 244 and/or a back plane I/O 252 (e.g., an uplink port) such as, for example, the back plane I/O 30 (FIG. 1A), described above.

Thus, the backboard 240 may be customized and/or differentiated. For example, the backboard 240 may include a user specific I/O, a management element, and so on, or combinations thereof. In addition, the network fabric 244 and/or the back plane I/O 252 may be depopulated. Moreover, the backboard 240 may include any number of slots, such as three horizontally adjacent slots for a 1 U open rack implementation, a custom implementation, and so on, or combinations thereof. In the illustrated example, of FIG. 2A, the backboard 240 includes a mezzanine area 254 to facilitate functionality flexibility, scalability, and so on, or combinations thereof.

FIG. 2B shows a backboard configuration 204 for a 2 U implementation B (FIG. 1A), described above. A first tier 256 (e.g., lower tier) of the backboard configuration 204 is defined by the dynamic function backboard 240, and a second tier 258 (e.g., an upper tier) is defined by a dynamic function backboard 260, which is coupled with the backboard 240 at the mezzanine region 252. The backboard 260 includes a module interface 242 (242*c*-242*d*) to provide a PCIe link of the PCIe fabric. In a multi-tier configuration, a mezzanine connector may be provided to couple the PCIe links of an upper tier with the network fabric 244.

Thus, a hardware module (e.g., a processor module) may be accommodated at the slot 0 and/or the slot 1 and a hardware module (e.g., processor module) may be accommodated at slot 2 and/or slot 3, wherein the network fabric 244 may be utilized when the hardware modules communicate across a respective PCIe link of the PCIe fabric directly coupling the slots 0-3 with the network fabric 244. In addition, a hardware module (e.g., a processor module) may be accommodated at the slot 0 and/or the slot 1 and a hardware module (e.g., an I/O module) may be accommodated at the slot 2 and/or the slot 3, wherein the network fabric 244 may be bypassed when the hardware modules communicate across a point-to-point PCIe link of the PCIe fabric directly coupling the slots 0-3. Moreover, the PCIe fabric may include a dual star PCIe link. Thus, the network fabric 244 may be bypassed when the hardware modules communicate across the dual star PCIe link of the PCIe fabric directly coupling the slots 0-3. The PCIe fabric may also include a PCIe link directly coupling any of the slots 0-3 (e.g., accommodating a processor module) with the back plane I/O 252, wherein the network fabric 252 may be bypassed when the hardware modules accommodated at the slots 0-3 (e.g., a processor module) communicate across the back plane I/O 252.

The backboard 260 also includes a storage component 248 (248*c*-248*d*) such as, for example, an mSATA SSD. Thus, the hardware module accommodated at the slot 2 may be booted using mSATA SSD 248*c* while the hardware module accommodated at the slot 3 may be booted using mSATA SSD 248*d*. In addition, the backboard 260 includes a protocol controller 251 (251*f*-251*g*) such as, for example, a gigabit Ethernet controller that may be disposed between the PCIe fabric and the network fabric 244 and/or the back plane I/O 252. The backboard 260 may also be customized and/or differentiated, may be scaled, may be expanded, and so on, of combinations thereof. For example, the backboard 260 may be scaled to a three rack unit implementation, a four rack unit implementation, and so on, or combinations thereof. In another example, the backboard 260 may include a user specific I/O, a management element, and so on, or combinations thereof.

Figure 3B:
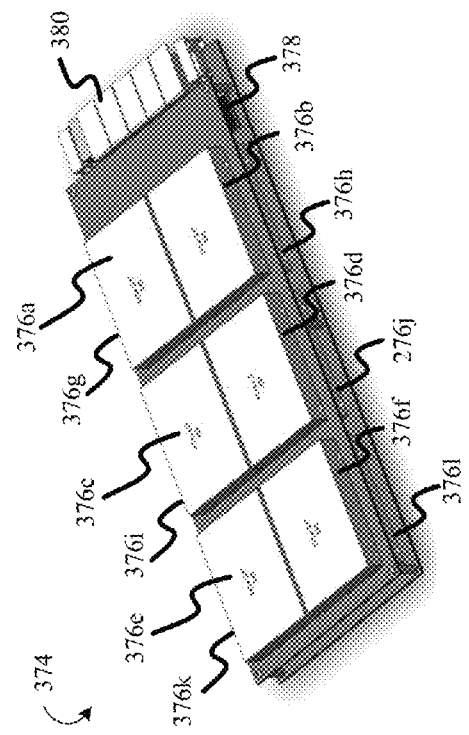
FIGS. 3A to 3D are perspective views of example hardware modules according to an embodiment.
Figure 3D:
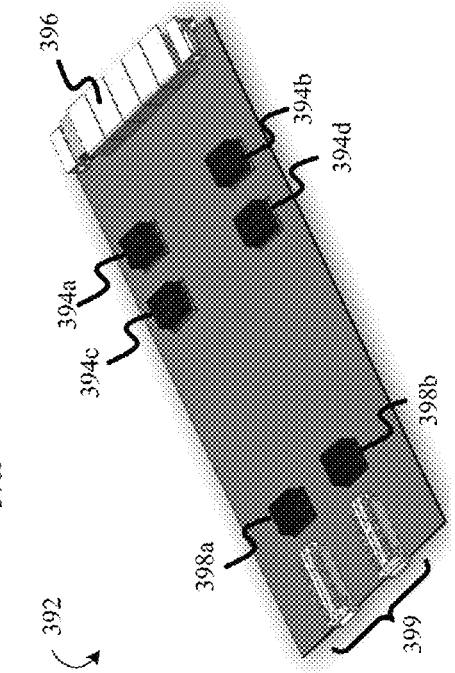
Figure 3A:
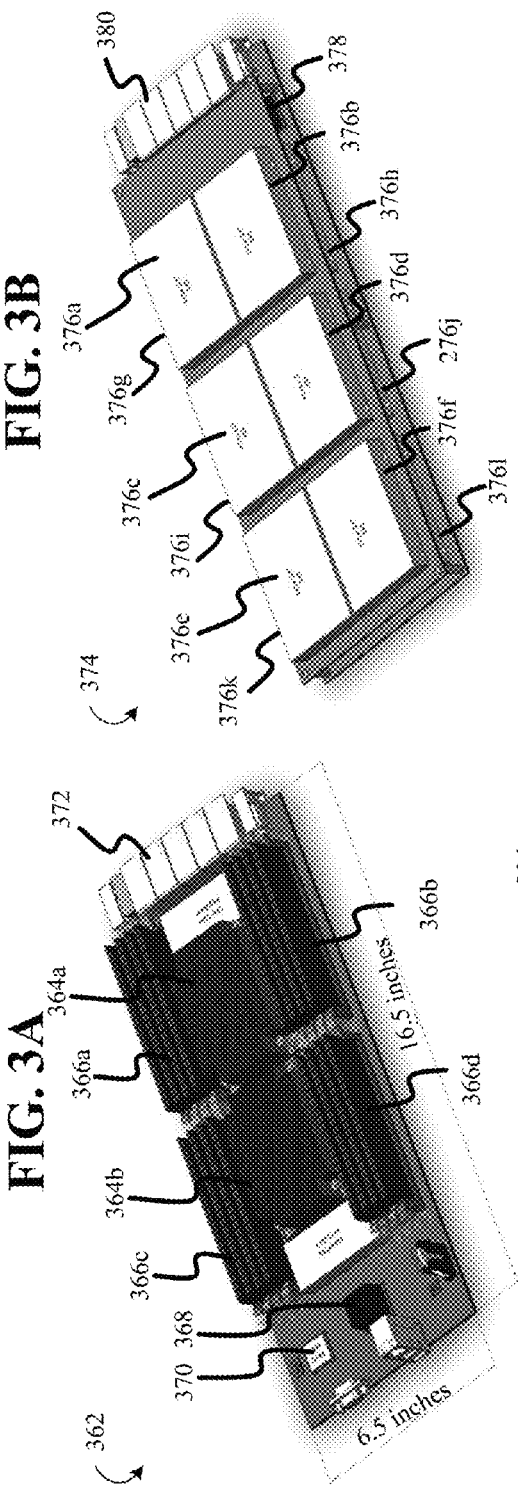

FIGS. 3A to 3D show example hardware modules according to an embodiment. FIG. 3A shows a processor module 362, including a plurality of processor cores 364 (364*a*-364*b*) and memory 366 (366*a*-366*d*). The memory may include, for example, dual inline memory (DIMM) (e.g., double data rate (DDR) DIMM). The processor module 362 also includes a platform controller hub (PCH) 368, also known as a Southbridge. In addition, the processor module 362 includes a baseboard management controller (BMC) 370, which may be coupled with the PCH 368. The PCH 368 may also be coupled with an integrated memory controller (iMC), also known as a Northbridge, wherein the iMC/CPU/PCH may be referred to as a chipset. Moreover, the processor module 362 includes a series of connectors 372 that may include a network fabric interface, a dual star PCIe fabric interface, a back panel I/O interface, a user specific I/O interface, a management interface, power, ground, and so on, or combinations thereof. In one example, a PCIe 3.0 connector (e.g., X40 per processor) may be utilized to provide approximately 640 Gbps.

The hardware module may include a form factor specific module including a defined size. In one example, the processor module 362 may be approximately 6.5 inches wide and approximately 16.5 inches long. Thus, the processor module 362 may be utilized in any standard specification such as, for example, in a 19 inch rack specification, an open rack specification, and so on. In addition, the processor module 362 may be an off the shelf module, facilitating mix and match functionality, plug and play functionality, and so on, or combinations thereof. Moreover, the processor module 362 may be manufacturer agnostic. For example, a core from any manufacturer may be utilized, memory from any manufacturer may be utilized, and so on, or combinations thereof. In another example, the processor module 362 may include a form factor specific user defined module, which may also be approximately 6.5 inches wide and approximately 16.5 inches long for e.g., a 19 inch rack specification and include user defined core configurations, memory configurations, chipset configurations, connector configurations, functionality, and so on, or combinations thereof. In addition, the processor module 362 may be custom.

FIG. 3B shows a memory module 374 including a plurality of PCIe SSDs 376 (376*a*-376*l*). The memory module 374 also includes PCIe switch 378 and a series of connectors 380 that may include a network fabric interface, a dual star PCIe fabric interface, a back panel I/O interface, a user specific I/O interface, a management interface, power, ground, and so on, or combinations thereof. In one example, a PCIe 3.0 connector may be utilized to provide approximately 128 Gbps for the twelve SSDs 376*a*-376*l*. The memory module 374 may be form factor specific, approximately 6.5 inches wide and approximately 16.5 inches long for e.g., a 19 inch rack specification, may be manufacturer agnostic, may be off the shelf, may be user specific, may be custom, and so on, or combinations thereof.

Figure 3C:
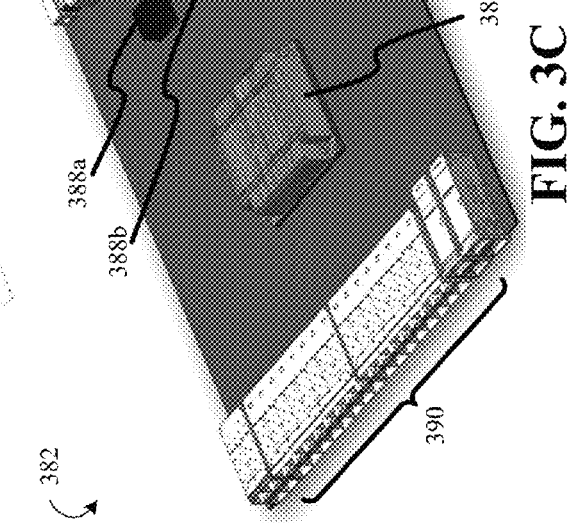

FIG. 3C shows an OF/SDN Ethernet module 382 including a network fabric 384 (e.g., Ethernet switch) and a series of connectors 386 (386*a*, 386*b*) that may include a network fabric interface, a dual star PCIe fabric interface, a back panel I/O interface, a user specific I/O interface, a management interface, power, ground, and so on, or combinations thereof. In one example, a PCIe 3.0 connector may be utilized to provide approximately 256 Gbps from one and/or two processor modules to the network fabric 384 to allow, for example, deep packet inspection (DPI) functionality. In addition, the OF/SDN Ethernet module 382 includes a protocol controller 388 (388*a*-388*d*) such as, for example, a gigabit Ethernet controller that may be disposed between a PCIe fabric and the network fabric 384. Moreover, the OF/SDN Ethernet module 382 includes connectors 390 such as, for example, an SFP connector, a QSFP connector, and so on, or combinations thereof. The OF/SDN Ethernet module 382 may be form factor specific, approximately 13 inches wide and approximately 16.5 inches long (e.g., double wide) for e.g., a 19 inch rack specification, may be manufacturer agnostic, may be off the shelf, may be user specific, may be custom, and so on, or combinations thereof.

FIG. 3D shows an network security module 392 including a security element 394 (394*a*-394*d*) (e.g., 50 Gpbs crypto each) and a series of connectors 396 that may include a network fabric interface, a dual star PCIe fabric interface, a back panel I/O interface, a user specific I/O interface, a management interface, power, ground, and so on, or combinations thereof. In one example, a PCIe 3.0 connector may be utilized to provide approximately 200 Gpbs cryptography bandwidth. In addition, the network security module 392 includes a protocol controller 398 (398*a*-398*b*) such as, for example, a gigabit Ethernet controller that may be disposed between a PCIe fabric and connectors 399 such as, for example, a SFP connector, a QSFP connector, and so on, or combinations thereof. The network security module 392 may be form factor specific, 6.5 inches wide and approximately 16.5 inches long for e.g., a 19 inch rack specification, may be manufacturer agnostic, may be off the shelf, may be user specific, may be custom, and so on, or combinations thereof.

Figure 4A:
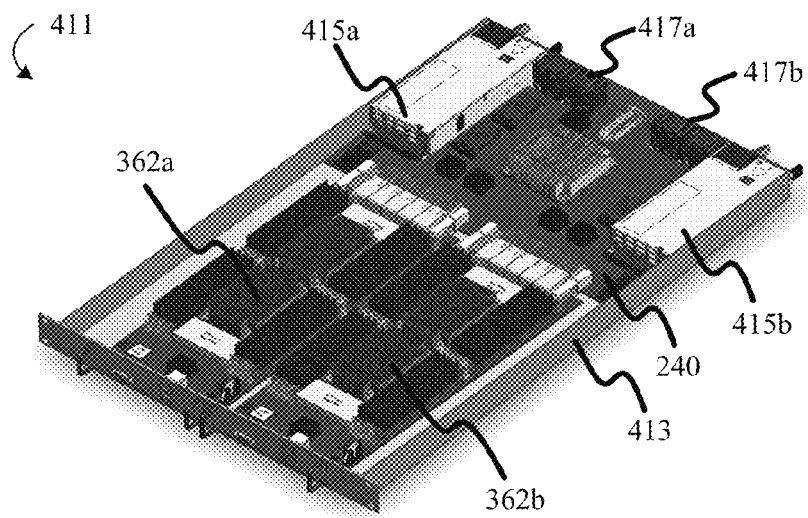
FIGS. 4A to 4C are perspective views of example one rack unit implementations according to an embodiment.
Figure 4B:
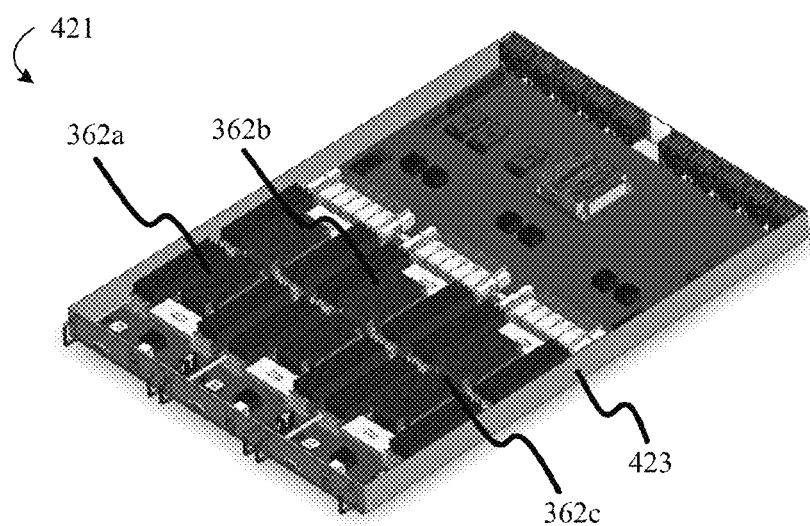
Figure 4C:
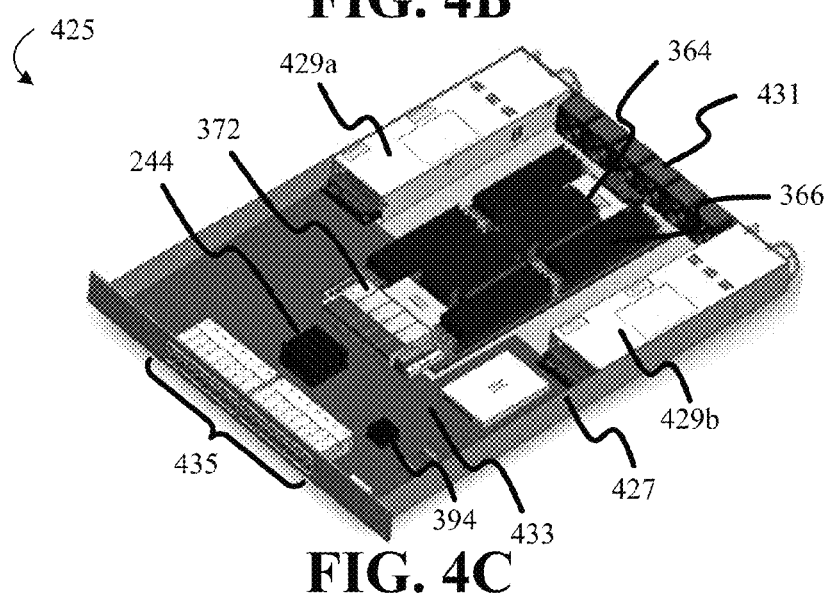

Turning now to FIGS. 4A to 4C, example one rack unit implementations are shown according to an embodiment. FIG. 4A shows a compute server 411 including a chassis 413 for a 1 U implementation of a 19 inch rack specification. The compute server 411 also includes a power supply element 415 (415*a*-415*b*) to provide power and/or back-up power. In addition, the computer server 411 includes a temperature controller element 417 (417*a*-417*b*) such as, for example, a fan to provide temperature control. The chassis 413 accommodates the backboard 240 (FIG. 2A), described above, and two of the processor modules 362 (362*a*-362*b*) (FIG. 3A), described above. Thus, for example, the compute server 411 may include four processor cores 364 and thirty-two DIMMs 366. In addition, the network fabric 244 and the back plane I/O 252 may be populated.

Mix and match functionality and/or functional flexibility may be provided. For example, processor module 362*b* may be removed and replaced with the memory module 382 (FIG. 3B), described above, to provide a storage server. Thus, for example, the storage server may include two processor cores 364 and twelve SSDs 376. The configuration may provide, for example, greater than approximately 10 Gbps to each SSDs 376. Moreover, the network fabric 244 may be depopulated and the back plane I/O 252 may be populated. In another example, the processor module 362*b* may be removed and replaced with the network security module 392 (FIG. 3D), described above, to provide a network security server. Thus, for example, the network security server may include two processor cores 364 and four security components 394. In addition, the network fabric 244 may be depopulated and the back plane I/O 252 may be depopulated.

FIG. 4B shows a compute server 421 including a chassis 423 for a 1 U implementation of an open rack specification. The compute server 421 is similar to the compute server 411 (FIG. 4A), described above, except that the width of the backboard 240 is increased to account for the OCP/open rack specification and that additional components and/or elements may be included. Thus, for example, an additional processor module 362 (362*c*) may be accommodated by a third slot horizontally adjacent to the slot 0 and the slot 1 of the backboard 200.

FIG. 4C shows a compute server 425 including a chassis 427 for a 1 U implementation of a 19 inch rack specification. The chassis 427 accommodates a fixed function backboard 433 to provide a purpose built appliance such as, for example, a purpose built in OF/SDN/Security appliance. Thus, backboard 433 may include a processor module similar to the processor module 362 (FIG. 3A), described above, having the processor core 364, the memory 366, and the connector 372. In addition, the backboard 433 may include the network fabric 244 (FIG. 2A), described above. Moreover, the backboard 433 may include the security element 394 (FIG. 3D), described above. In the illustrated example of FIG. 4C, there may be a direct connect point-to-point PCIe link from the processor core 364 to the security component 394, a direct connect point-to-point PCIe link from the processor core 364 to the network fabric 244, and so on, or combinations thereof.

The backboard 433 also includes a power supply 429 (429*a*-429*b*) to provide power and/or back-up power. In addition, the backboard 433 includes a temperature controller element 431 such as, for example, a fan to provide temperature control. Moreover, the backboard 433 includes connector 435 such as, for example, a SFP connector, a QSFP connector, and so on, or combinations thereof. Thus, a user may choose and/or define a purpose built backboard to obtain specific functionality, specific density, multi-functionality, speed, cost savings, and so on, or combinations thereof.

Figure 5A:
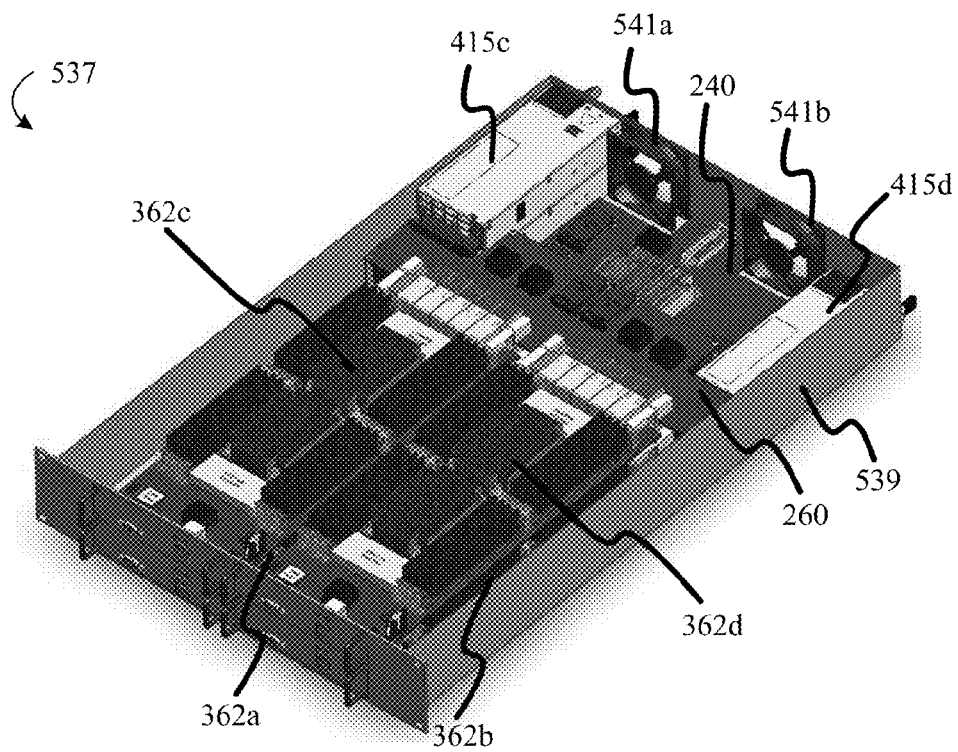
FIGS. 5A to 5B are perspective views of example two rack unit implementations according to an embodiment.
Figure 5B:
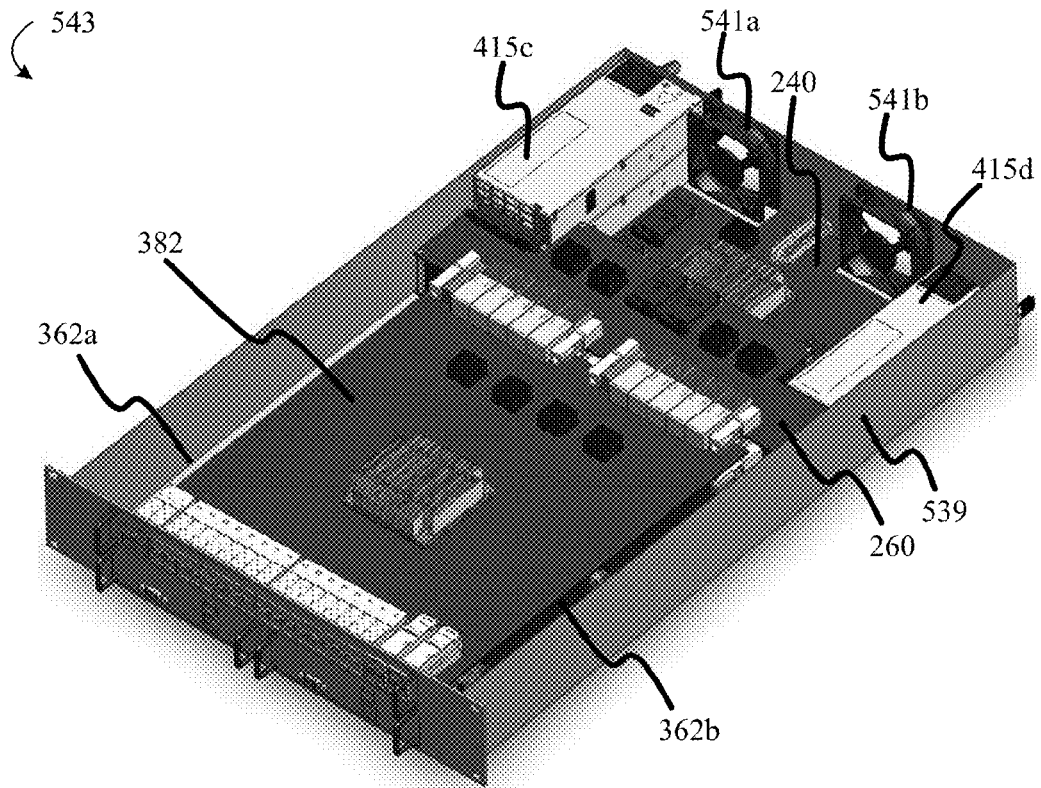

FIGS. 5A to 5B show example two rack unit (2 U) implementations according to an embodiment. FIG. 5A shows a compute server 537 including a chassis 539 for a 2 U implementation of a 19 inch rack specification. The compute server 537 is similar to the compute server 411 (FIG. 4A), described above, except that the height of the chassis 539 has increased to account for the 2 U implementation of the 19 inch rack specification and that additional elements and/or components are included to account for the 2 U implementation. The compute server 537 includes a power supply 415 (415*a*-415*d*) to provide power and/or back-up power. In addition, the compute serve includes a temperature controller 541 (541*a*-541*b*) such as, for example, a fan to provide temperature control. Any temperature controller may be utilized when provided.

The chassis 539 accommodates the backboard 240 (FIG. 2A), described above, and the backboard 260 (FIG. 2B), described above. Thus, for example, the compute server 537 may include eight processor cores 364 and ninety-six DIMMs 366. In addition, the network fabric 244 and the back plane I/O 252 may be populated. Mix and match functionality and/or functionality flexibility may be provided by, for example, removing the processor modules 362 (362*a*-362*b*). FIG. 5B shows an OF/SDN Ethernet switch 543, which is similar to the compute server 537 (FIG. 5A), described above, except that the processor modules 362*c* and 362*d* in the top tier of the 2 U implementation have been removed and replaced with the security module 382 (FIG. 3C), described above. In addition, the network fabric 244 and the back plane I/O 252 may be depopulated.

Figure 6:
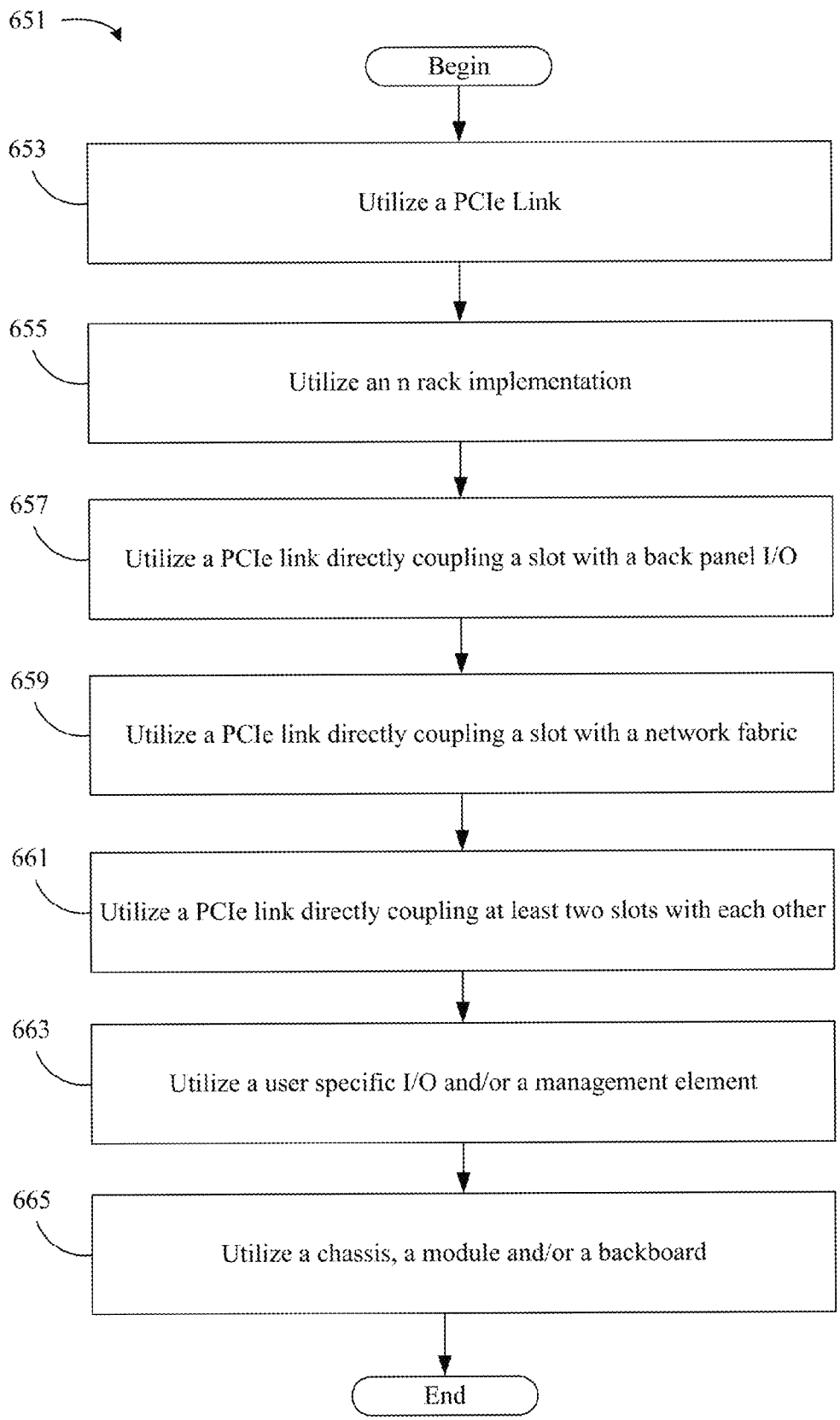
FIG. 6 is a flowchart of an example of a method to utilize a PCIe link according to an embodiment.

Turning now to FIG. 6, a method 651 is shown to utilize a PCIe link according to an embodiment. The method 651 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 651 may be written in any combination of one or more programming languages, including an object oriented programming language such as C++ or the like and conventional procedural programming languages, such as the "C" programming language or similar programming languages. Moreover, the method 651 may be implemented using any of the herein mentioned circuit technologies.

Illustrated processing block 653 provides for utilizing a serial link, such as a PCI express (PCIe) link. The PCIe link may directly couple a slot, defined by a surface (e.g., a module interface surface, a chassis surface, etc.) and/or accommodating a hardware module, with one or more other slots, with an element proximate to the slot, and so on, or combinations thereof. For example, the PCIe link may directly couple the slot with an element located at the same chassis as the slot, at the same backboard tier as the slot, at the same backboard configuration as the slot, at the same rack unit implementation as the slot, and so on, or combinations thereof. In one example, the PCIe link may directly couple the slot with a network fabric, a network security chip, a port, and so on, or combinations thereof.

Thus, the PCIe link may be utilized to provide communication between a hardware module and a network fabric (e.g., Ethernet switch), a network security chip, and so on, or combinations thereof. The PCIe link may also be utilized to provide communication between the hardware module and one or more other hardware modules utilizing, for example, the network fabric, a direct connect point-to-point PCIe link between the hardware modules, a direct connect dual star PCIe link between the hardware modules, a PCIe link between hardware modules at different tiers of a backboard configuration, and so on, or combinations thereof. The PCIe link may also be utilized to provide communication between the hardware module and a back panel input/output (I/O), such as an uplink port. In addition, the PCIe link may be utilized to provide communication between the hardware module and a user specific I/O, a management element, and so on, or combinations thereof. Moreover, the PCIe link may define a PCIe fabric that may be implemented alone, with a network fabric (e.g., a hybrid fabric), and so on, or combinations thereof.

Illustrated processing block 655 provides for utilizing an n rack implementation, wherein n may be 1 for a one rack unit (1 U) implementation, 2 for a two rack unit (2 U) implementation, 3 for a three rack unit (3 U) implementation, 4 for a four rack unit (4 U) implementation, 42 for a 42 rack unit (42 U) implementation, and so on. In one example, the processing block 655 may provide for utilizing a 1 U implementation including two or three slots, based on a rack specification, a 2 U implementation including four or six slots, based on a rack specification, a 3 U implementation including six or nine slots, based on a rack specification, a 4 U implementation including eight or twelve slots, based on a rack specification, and so on. The n rack unit implementation may also include a custom unit implementation based on a user defined specification.

Illustrated processing block 657 provides for utilizing an additional PCIe link directly coupling a slot with a back panel I/O. In one example, the processing block 657 may provide for utilizing a 1 U implementation including two slots, wherein at least one slot accommodates a processor module, may be directly coupled with a network fabric via a PCIe link, and may be directly coupled with the back panel I/O via an additional PCIe link. Thus, the network fabric may be bypassed when the processor modules communicates in/out across the back panel I/O. In another example, the processing block 657 provides for utilizing a 4 U implementation including eight slots, wherein at least two slots accommodate a processor module (e.g., slot 0 and slot 4), may be directly coupled with a network fabric via a PCIe link, and may be directly coupled with the back panel I/O via an additional PCIe link. Thus, the network fabric may be bypassed when the processor modules communicate in/out across the back panel I/O. In a further example, the processor modules may communicate in/out across the back panel I/O utilizing the network fabric.

Illustrated processing block 659 provides for utilizing a PCIe link directly coupling a slot with a network fabric. In one example, the processing block 659 provides for utilizing at least two slots that accommodate a respective processor module, which may be directly coupled with the network fabric via a PCIe link, wherein the network fabric may be utilized when the respective processor modules communicate with each other across the PCIe link directly coupling each of the slots with the network fabric. In another example, the processing block 659 provides for utilizing at least two slots that accommodate a respective processor module, which may be directly coupled with the network fabric via a PCIe link, wherein the network fabric may be bypassed when the respective processor modules communicate across an additional PCIe link directly coupling each of the at least two slots via a bridge. For example, the bridge may be utilized to provide communications across the same tier of a backboard configuration, different tiers of a backboard configuration, and so on, or combinations thereof.

Illustrated processing block 661 provides for utilizing a PCIe link directly coupling at least two slots with each other. In one example, the processing block 661 provides for utilizing an additional PCIe link directly coupling a slot that accommodates a processor module with a slot that accommodates an I/O module, such as a memory module, a network security module, and so on, or combinations thereof. For example, the additional PCIe link may include a direct connect point-to-point PCIe link between the modules. Thus, the network fabric may be bypassed when the processor module and the I/O module communicate across the additional PCIe link. In another example, the processing block 661 provides for utilizing a dual star PCIe link directly coupling four slots with each other (e.g., a 2 U subsection). Thus, the network fabric may be bypassed when at least two hardware modules (e.g., the processor module and the PCIe module) communicate with each other across the dual star PCIe link.

Illustrated processing block 663 provides for utilizing a user specific I/O and/or a management element. In one example, the processing block 663 provides for utilizing a PCIe link coupling a slot with the user specific I/O and/or the management element to provide user specific functionality and/or management functionality. The PCIe link may be part of PCIe fabric, a hybrid fabric including the PCIe fabric and the network fabric, and so on, or combinations thereof.

Illustrated processing block 665 provides for utilizing a chassis including a surface defining a slot, wherein the chassis may include a standard size corresponding to a rack specification. In addition, the processing block 665 provide for utilizing a module, such as a form factor specific off the shelf module including a pre-set configuration, a pre-set functionality, a pre-set size, a module that may be implemented in a plurality of slots, in a plurality of backboard configurations, in a plurality of rack unit implementation, in a plurality of chassis, and so on, or combinations thereof.

The processing block 665 also provides for utilizing a form factor specific user defined module, such as a module including a user defined configuration, a user defined functionality, a pre-set size, a module that may be implemented in a plurality of slots, in a plurality of backboard configurations, in a plurality of rack unit implementation, in a plurality of chassis, and so on, or combinations thereof. In addition, the processing block 665 provides for utilizing a backboard. In one example, a dynamic function backboard may be utilized allowing the hardware modules to be replaced, the backboard to be swapped, the backboard to be contracted/expanded, the components and/or elements to be populated/depopulated, and so on, or combinations thereof.

The processing block 665 also provides for utilizing a fixed function backboard. Thus, the functionality of the backboard may be user specific, user defined, and so on, or combinations thereof. Notably, the functionality for the dynamic function backboard and the fixed function backboard may be the same or different, may use one or more PCIe links, may use a network fabric, and so on, or combinations thereof. Thus, the user may have flexibility in deployment choice based on personal interest. In addition, the processing block 665 may utilize custom chassis, modules, backboards, and so on, or combinations thereof.

Figure 7:
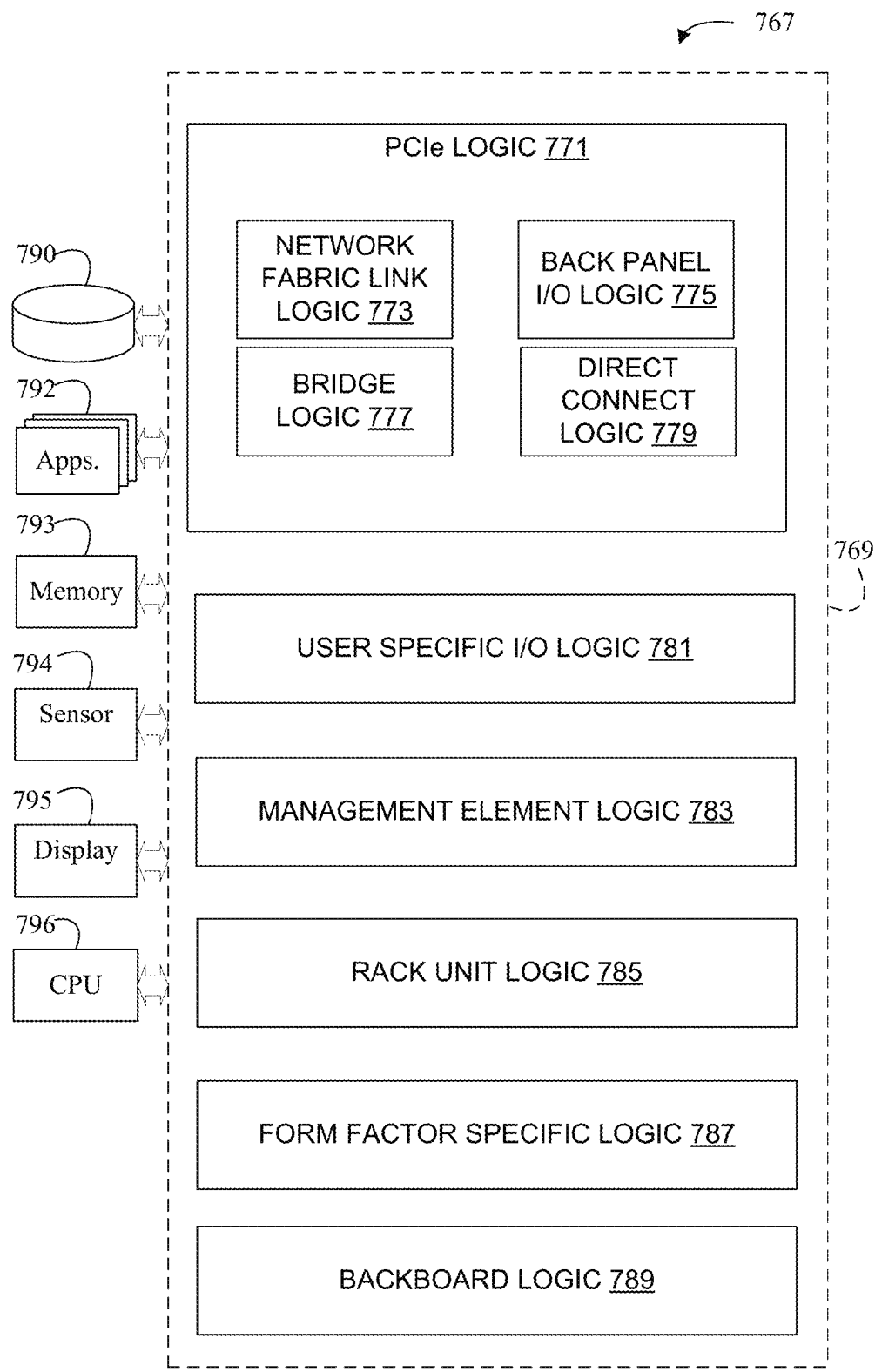
FIG. 7 is a block diagram of an example of a logic architecture according to an embodiment.

FIG. 7 shows an apparatus 767 including logic 769 to utilize a PCIe link according to an embodiment. The logic architecture 769 may be generally incorporated into a platform such as such as a laptop, personal digital assistant (PDA), wireless smart phone, media player, imaging device, mobile Internet device (MID), any smart device such as a smart phone, smart tablet, smart TV, computer server (e.g., compute server, storage server, network security server, storage server, etc.), top of rack (TOR) switch, wearable computer, and so on, or combinations thereof. The logic architecture 769 may be implemented in an application, operating system, media framework, hardware component, and so on, or combinations thereof. For example, the logic architecture 769 may be implemented in a processor, such as a central processing unit (CPU), a graphical processing unit (GPU), a visual processing unit (VPU), a sensor, an operating system, an application, and so on, or combinations thereof. The apparatus 767 may include and/or interact with storage 790, applications 792, memory 793, sensor 794, display 795, CPU 796, and so on, or combinations thereof.

The illustrated logic architecture 767 includes serial link logic, such as a PCIe logic 771 to utilize a PCIe link. The PCIe logic 771 includes a network fabric link logic 773 to utilize a PCIe link directly coupling a slot with a network fabric. For example, two PCIe links may directly couple two slots with the network fabric, wherein the network fabric link logic 773 may utilize the PCIe links to pass data between hardware modules accommodated at the two slots. Thus, the network fabric may be utilized. The PCIe logic 771 also includes a back panel I/O logic 775 to utilize an additional PCIe link directly coupling a slot with a back panel I/O. For example, a PCIe link may directly couple a slot with the back panel I/O, wherein the back panel I/O logic 775 may utilize the PCIe link to pass data between a hardware module accommodated at the slot and a device coupled with the back panel I/O. Thus, the network fabric may be bypassed. The back panel I/O logic 775 may, for example, also utilize the network fabric by utilizing an additional PCIe link between the network fabric and the back panel I/O.

The PCIe logic 771 includes a bridge logic 777 to utilize a PCIe link directly coupling a slot with a bridge (e.g., PCIe to Ethernet bridge). For example, two PCIe links may directly couple two slots with the bridge, wherein the bridge logic 777 may utilize the PCIe links to pass data between hardware modules accommodated at the two slots across the bridge. Thus, the network fabric may be bypassed. The PCIe logic 771 also include a direct connect logic 779 to utilize a PCIe link directly coupling at least two slots with each other. In one example, one PCIe link may directly couple two slots with each other, wherein the direct connect logic 779 may utilize the PCIe link to pass data between hardware modules accommodated at the two slots. In another example, a dual star PCIe link may directly couple four slots with each other, wherein the direct connect logic 779 may utilize the dual star PCIe link to pass data between hardware modules accommodated at the four slots.

The logic architecture 769 includes a user specific I/O logic 781 and a management element logic 783 to provide user defined functionality and/or management functionality. For example, the user specific I/O logic 781 may utilize a PCIe link coupling a slot with a user specific I/O (directly and/or via a network fabric) to pass data between a hardware module accommodated at the slot and the user specific I/O to implement user defined functionality. In another example, the management element logic 783 may utilize a PCIe link coupling a slot with a management element (directly and/or via a network fabric) to pass data between a hardware module accommodated at the slot and management element. Thus, the user specific I/O logic 881 and/or the management element logic 883 may be integral with the PCIe logic 775.

The logic architecture 769 includes a rack unit logic 785 to utilize a rack unit implementation such as, for example, a rack unit implementation (e.g., 1 U, 2 U, 3 U, 4 U, etc.). The logic architecture 769 also includes a form factor specific logic 787 to utilize, for example, a form factor specific off the shelf module, a utilize a form factor specific user defined module, and so on, or combinations thereof. In addition, the logic architecture 767 includes a backboard logic 789 to utilize a backboard including a dynamic function backboard, a fixed function backboard, and so on, or combinations thereof. Thus, the rack unit logic 785, the form factor specific logic 787, the backboard logic 789, etc., may be integral with the PCIe logic 775.

The logic architecture 769 may also include any other logic to utilize a PCIe link. For example, the logic architecture 769 may also include a custom logic to utilize, for example, a custom chassis, a custom module, a custom backboard, a custom unit implementation, and so on, or combinations thereof. In addition, logic architecture 769 may include a user interface logic to provide any desired interface, such as a graphical user interface, a command line interface, and so on, or combinations thereof. The user interface logic may provide access to one or more settings associated with utilizing a PCIe link. Moreover, the logic architecture 769 may include a communications module to provide a wide variety of communication functionality, such as cellular telephone (e.g., W-CDMA (UMTS), CDMA2000 (IS-856/IS-2000), etc.), WiFi, Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes.

While examples have shown separate logic for illustration purposes, it is should be understood that one or more of the logic of the logic architecture 769 may be implemented in one or more combined logic, such as a single logic including one or more of the PCIe logic 771, the user specific I/O logic 781, the management element logic 783, the rack logic 785, the form factor specific logic 787, the backboard logic 789, and so on. In addition, it should be understood that one or more logic components of the apparatus 767 may be on platform, off platform, and/or reside in the same or different real and/or virtual space as the apparatus 767. Accordingly, the logic may be functionally separate logic, processes, and/or threads, may run on the same computing device and/or distributed across multiple devices to run concurrently, simultaneously, in parallel, and/or sequentially, may be combined into one or more independent logic blocks or executables, and/or are described as separate components for ease of illustration.

Figure 8:
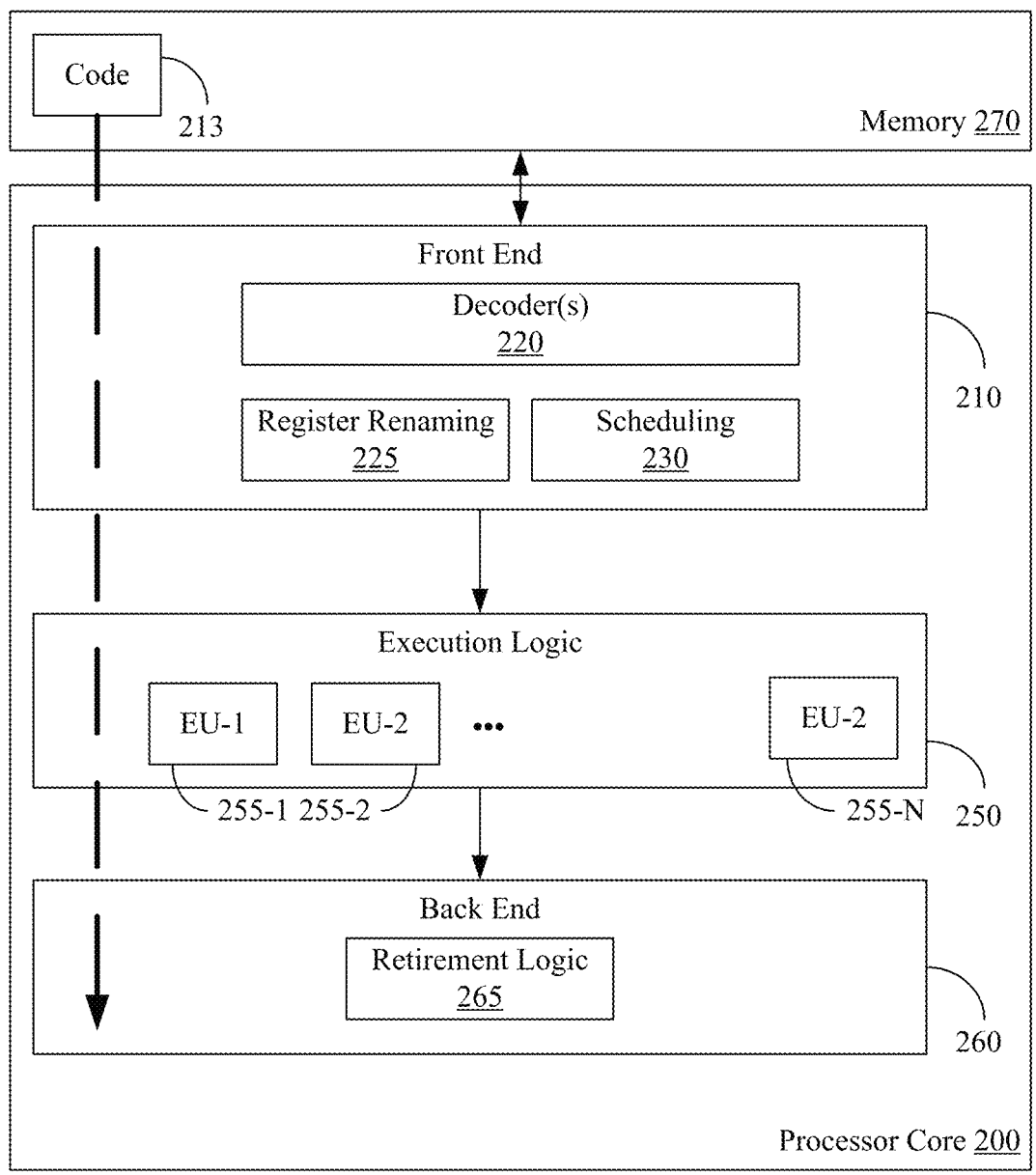
FIG. 8 is a block diagram of an example of a processor according to an embodiment.

Turning now to FIG. 8, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 769 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
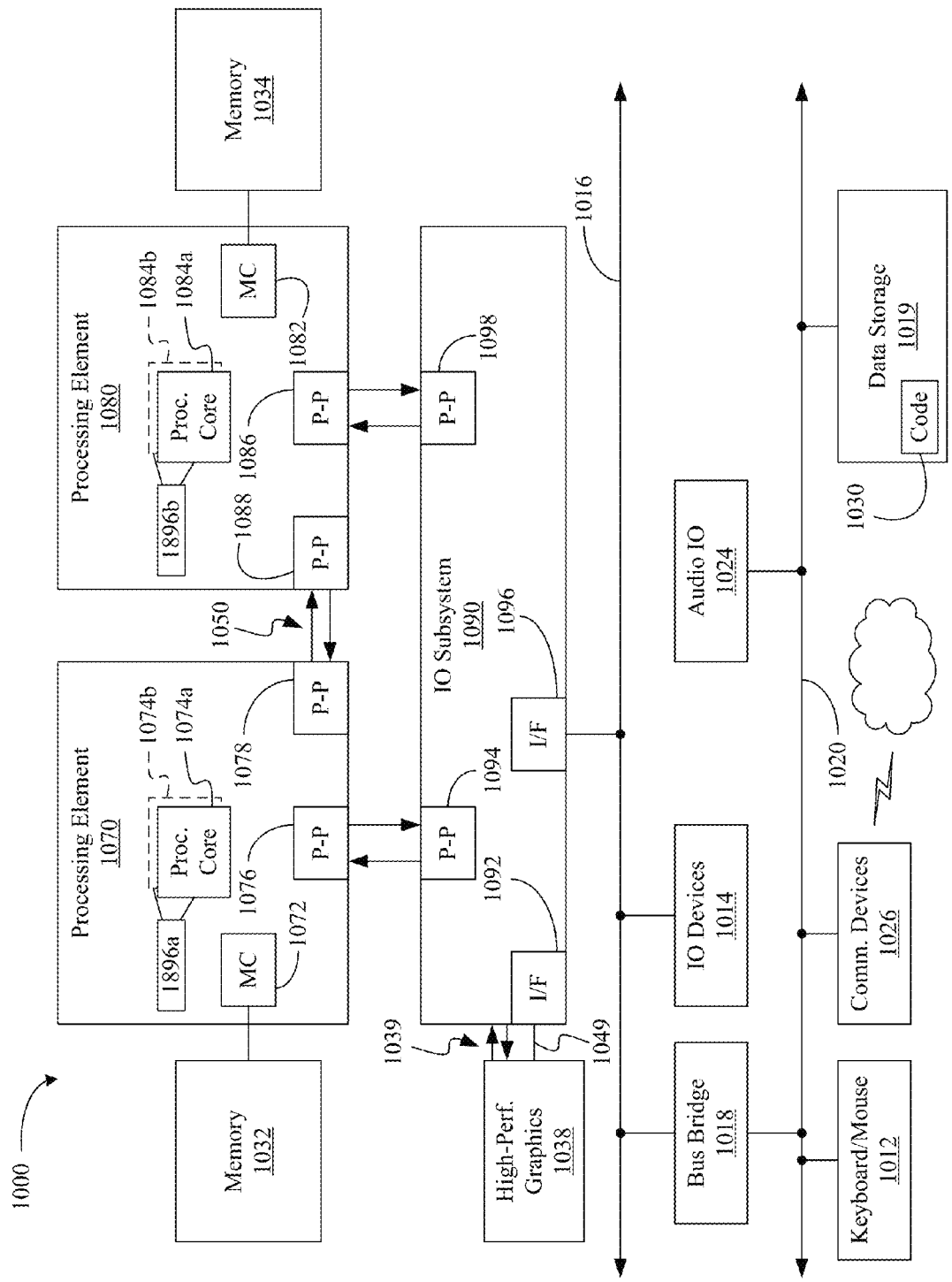
FIG. 9 is a block diagram of an example of a system according to an embodiment.

FIG. 9 shows a block diagram of a system 1000 in accordance with an embodiment. Shown in FIG. 9 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to that discussed above in connection with FIG. 8.

Each processing element 1070, 1080 may include at least one shared cache 1896. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 9, various I/O devices 1014 such as the display 795 (FIG. 7) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the logic architecture 769 (FIG. 7), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Thus, embodiments may include an open converged modular architecture to provide flexibility, interoperability, scalability, and so on, or combinations thereof. For example, embodiments may provide common modular building blocks, wherein a user may be able to build to a given set of form factors to implement a unified solution. In one example, users may build a module that can plug and play without requiring software changes. In another example, the user may implement any form factor, such as a form factor based on industry standards. In addition, a module may be utilized by various types users, such as datacenters, end users, and so on, or combinations thereof. Moreover, the modular approach may replace motherboard approaches that may be relatively large, non-modular, lack generic relatively high-speed data I/O, etc.

Embodiments may also provide for scalable bandwidth. For example, scalable multi-100 Gpbs internal and external bandwidth may be provided. In one example, PCIe may include x8, x16, etc. links that attached at a network fabric and/or between modules to provide scalable bandwidth. Embodiments may provide for mix and match functionality, such as mix and match compute, networking security, storage, and so on, or combinations thereof. For example, a user may utilize the same chassis technology to implement functionality, may reconfigure the system as desired, and so on, or combinations thereof. Moreover, blade solutions that may be relatively expensive, large, complex to implement, etc., may be replaced by the mix and match approach.

Embodiment may provide a hybrid fabric with native workflow support, such as native SDN, OF, and NFV support. For example, the hybrid fabric may include a PCIe fabric (e.g., a PCIe link) and a network fabric. In one example, a different switch chip may be utilized to allow different capabilities. Moreover, conventional architectures that may not leverage NFV/SDN techniques and/or rely on separate NFV/SDN overlay via a separate TOR switch (e.g., is not physically relatively close to compute, storage, I/O elements, etc.) may be replaced by the hybrid fabric approach.

Embodiment may provide relatively lower cost. For example, the total size of a rack may be utilized relatively more effectively, cabling between purpose built equipment may be relatively reduced, and so on, or combinations thereof. For example, a conventional architecture may require using relatively expensive cables (e.g., optical connectivity) having relatively limited bandwidth to connect via a TOR, and/or may not be possible based on an overlay of slots to be consumed.

Embodiments may also provide relatively dense configurations by, for example, flexibly packing varying functionality, components and/or elements. In addition, embodiments may be configurable by, for example, configuring a fabric, a backboard, a module, a chassis, a rack, and so on, or combinations thereof. Thus, conventional architecture may not provide a user defined I/O and/or may utilize a protocol as a fabric interface that may limit user differentiation capabilities and/or options. In addition, conventional architecture may attempt to provide solutions (e.g., networking, storage, etc.) by not allowing PCIe implementations in the architecture.

Embodiments may be relatively energy efficient. A conventional architecture utilizing a network fabric may require additional CPU's to gather data from Ethernet links and convert to PCIe for an I/O (e.g., SSD), which may substantially reduce capacity, relatively increase power and/or latency, and so on, or combinations thereof. Embodiments may also be vendor agnostic and/or rack agnostic. For example, the user may utilize any form factor (e.g., may have a custom rack, a custom module, a custom backboard, a custom chassis), any type of processor, any type of memory, any type of network fabric, and so on, or combinations thereof. Thus, embodiments may provide flexibility and/or scalability for rack mounted data center, storage, security, communication equipment, etc., for equipment utilized in a non-rack implementation (e.g., a non-rack mounted server, mobile computing device, etc.), and so on, or combinations thereof.

Additional Notes and Examples

Examples may include subject matter such as a method, means for performing acts of the method, at least one machine-readable medium including instructions that, when performed by a machine cause the machine to performs acts of the method, or an apparatus or system to utilize a PCIe link according to embodiments and examples described herein.

Example 1 may include an apparatus comprising a surface defining a slot to accommodate a hardware module. The apparatus may also include a peripheral component interconnect express (PCIe) link to directly couple the slot with a network fabric.

Example 2 may include the subject matter of Example 1 and further optionally may include a surface defining two or more slots, wherein a PCIe link directly couples each of the two or more slots with the network fabric.

Example 3 may include the subject matter of any of Example 1 to Example 2 and further optionally may include a one rack unit implementation, wherein at least one slot accommodates a processor module, and wherein an additional PCIe link directly couples each of the at least one slot with a back panel input/output (I/O), a two rack unit implementation, wherein at least one slot accommodates a processor module, and wherein an additional PCIe link directly couples each of the at least one slot with a back panel I/O, and/or a four rack unit implementation, wherein at least two slots accommodate a processor module, and wherein an additional PCIe link directly couples each of the at least two slots with a back panel I/O.

Example 4 may include the subject matter of any of Example 1 to Example 3 and further optionally may include at least two slots that accommodate a respective processor module, wherein the network fabric is utilized when the respective processor modules communicate across the PCIe link directly coupling each of the at least two slots with the network fabric, and/or at least two slots that accommodate a respective processor module, wherein the network fabric is bypassed when the respective processor modules communicate across an additional PCIe link directly coupling each of the at least two slots with a bridge.

Example 5 may include the subject matter of any of Example 1 to Example 4 and further optionally may include an additional PCIe link directly coupling a slot that accommodates a processor module with a slot that accommodates an I/O module, wherein the network fabric is bypassed when the processor module and the I/O module communicate across the additional PCIe link, and/or a dual star PCIe link directly coupling four slots with each other, wherein the network fabric is bypassed when at least two hardware modules communicate across the dual star PCIe link.

Example 6 may include the subject matter of any of Example 1 to Example 5 and further optionally may include a user specific I/O to provide user defined functionality, and/or a management element to provide management functionality.

Example 7 may include the subject matter of any of Example 1 to Example 6 and further optionally may include a hardware module including a processor module, a storage module, a networking module, a security module, a switch module, a micro-server module, a PCIe module, a graphics module, and/or a general purpose I/O card.

Example 8 may include the subject matter of any of Example 1 to Example 7 and further optionally may include a chassis including the surface defining the slot, wherein the chassis includes a standard size corresponding to a rack specification, a form factor specific off the shelf module, and/or a form factor specific user defined module.

Example 9 may include the subject matter of any of Example 1 to Example 8 and further optionally may include a backboard including a dynamic function backboard and/or a fixed function backboard.

Example 10 may include a method to utilize a PCIe link, comprising utilizing a peripheral component interconnect express (PCIe) link directly coupling a slot defined by a surface with a network fabric, wherein the slot accommodates a hardware module.

Example 11 may include the subject matter of Example 10 and further optionally may include utilizing a one rack unit implementation, wherein at least one slot accommodates a processor module, and wherein an additional PCIe link directly couples each of the at least one slot with a back panel input/output (I/O), utilizing a two rack unit implementation, wherein at least one slot accommodates a processor module, and wherein an additional PCIe link directly couples each of the at least one slot with a back panel I/O, and/or utilizing a four rack unit implementation, wherein at least two slots accommodate a processor module, and wherein an additional PCIe link directly couples each of the at least two slots with a back panel I/O.

Example 12 may include the subject matter of any of Example 10 to Example 11 and further optionally may include utilizing at least two slots that accommodate a respective processor module, wherein the network fabric is utilized when the respective processor modules communicate across a PCIe link directly coupling each of the at least two slots with the network fabric, and/or utilizing at least two slots that accommodate a respective processor module, wherein the network fabric is bypassed when the respective processor modules communicate across an additional PCIe link directly coupling each of the at least two slots with a bridge.

Example 13 may include the subject matter of any of Example 10 to Example 12 and further optionally may include utilizing an additional PCIe link directly coupling a slot that accommodates a processor module with a slot that accommodates an I/O module, wherein the network fabric is bypassed when the processor module and the I/O module communicate across the additional PCIe link, and/or utilizing a dual star PCIe link directly coupling four slots with each other, wherein the network fabric is bypassed when at least two hardware modules communicate across the dual star PCIe link.

Example 14 may include the subject matter of any of Example 10 to Example 13 and further optionally may include utilizing a user specific I/O to provide user defined functionality and/or utilizing a management element to provide management functionality.

Example 15 may include the subject matter of any of Example 10 to Example 14 and further optionally may include utilizing a chassis including the surfaces defining the slot, wherein the chassis includes a standard size corresponding to a rack implementation, utilizing a form factor specific off the shelf module, utilizing a form factor specific user defined module, and/or utilizing a backboard including one or more of a dynamic function backboard or a fixed function backboard.

Example 16 may include at least one computer-readable medium comprising one or more instructions that when executed on a computing device cause the computing device to utilize a peripheral component interconnect express (PCIe) link directly coupling a slot defined by a surface with a network fabric, wherein the slot is to accommodate a hardware module.

Example 17 may include the subject matter of Example 16 and further optionally may include, when executed the one or more instructions cause the computing device to utilize a one rack unit implementation, wherein at least one slot accommodates a processor module, and wherein an additional PCIe link directly couples each of the at least one slot with a back panel input/output (I/O), utilize a two rack unit implementation, wherein at least one slot accommodates a processor module, and wherein an additional PCIe link directly couples each of the at least one slot with a back panel I/O; and/or utilize a four rack unit implementation, wherein at least two slots accommodate a processor module, and wherein an additional PCIe link directly couples each of the at least two slots with a back panel I/O.

Example 18 may include the subject matter of any of Example 16 to Example 17 and further optionally may include, when executed the one or more instructions cause the computing device to utilize at least two slots that accommodate a respective processor module, wherein the network fabric is utilized when the respective processor modules communicate across a PCIe link directly coupling each of the at least two slots with the network fabric, and/or utilize at least two slots that accommodate a respective processor module, wherein the network fabric is bypassed when the respective processor modules communicate across an additional PCIe link directly coupling each of the at least two slots with a bridge.

Example 19 may include the subject matter of any of Example 16 to Example 18 and further optionally may include, when executed the one or more instructions cause the computing device to utilize an additional PCIe link directly coupling a slot that accommodates a processor module with a slot that accommodates an I/O module, wherein the network fabric is bypassed when the processor module and the I/O module communicate across the additional PCIe link, and/or utilize a dual star PCIe link directly coupling four slots with each other, wherein the network fabric is bypassed when at least two hardware modules communicate across the dual star PCIe link.

Example 20 may include the subject matter of any of Example 16 to Example 19 and further optionally may include, when executed the one or more instructions cause the computing device to utilize a user specific I/O to provide user defined functionality and/or utilize a management element to provide management functionality.

Example 21 may include the subject matter of any of Example 16 to Example 20 and further optionally may include, when executed the one or more instructions cause the computing device to utilize a chassis including the surfaces defining the slot, wherein the chassis includes a standard size corresponding to a rack specification, utilize a form factor specific off the shelf module, utilize a form factor specific user defined module, and/or utilize a backboard including one or more of a dynamic function backboard or a fixed function backboard.

Example 22 may include an apparatus comprising a surface defining a slot to accommodate a hardware module. The apparatus may also include logic to utilize a peripheral component interconnect express (PCIe) link directly coupling the slot with a network fabric.

Example 23 may include the subject matter of Example 22 and further optionally may include logic to utilize at least two slots that accommodate a respective processor module, wherein the network fabric is utilized when the respective processor modules communicate across a PCIe link directly coupling each of the at least two slots with the network fabric, and/or utilize at least two slots that accommodate a respective processor module, wherein the network fabric is bypassed when the respective processor modules communicate across an additional PCIe link directly coupling each of the at least two slots with a bridge.

Example 24 may include the subject matter of any of Example 22 to Example 23 and further optionally may include logic to utilize an additional PCIe link directly coupling a slot that accommodates a processor module with a slot that accommodates an I/O module, wherein the network fabric is bypassed when the processor module and the I/O module communicate across the additional PCIe link, and/or utilize a dual star PCIe link directly coupling four slots with each other, wherein the network fabric is bypassed when at least two hardware modules communicate across the dual star PCIe link.

Example 25 may include the subject matter of any of Example 22 to Example 24 and further optionally may include logic to utilize a chassis including the surfaces defining the slot, wherein the chassis includes a standard size corresponding to a rack specification, utilize a form factor specific off the shelf module, utilize a form factor specific user defined module, and/or utilize a backboard including one or more of a dynamic function backboard or a fixed function backboard.

Example 26 may include at least one computer-readable medium including one or more instructions that when executed on one or more computing devices causes the one or more computing devices to perform the method of any of Example 10 to Example 15.

Example 27 may include an apparatus including means for performing the method of any of Example 10 to Example 15.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, the specification, and following claims.

We claim:

1. A rack-scale architecture comprising:
a surface defining a slot to accommodate a hardware module; and
a peripheral component interconnect express (PCIe) fabric between the slot and
a network fabric, wherein the PCIe fabric is to include:
a PCIe link to directly couple the slot with the network fabric to provide a communication path including the network fabric; and
a further PCIe link to couple the slot with a further slot to provide a communication path excluding the network fabric, wherein the further slot is to accommodate a further hardware module,
wherein the rack-scale architecture is to include one or more of:
a one rack unit implementation, wherein at least one slot accommodates a respective processor module, and wherein an additional PCIe link is to directly couple the at least one slot with a back panel input/output (I/O);
a two rack unit implementation, wherein at least one slot accommodates a respective processor module, and wherein an additional PCIe link is to directly couple the at least one slot with a back panel I/O; or
a four rack unit implementation, wherein at least one slot accommodates a respective processor module, and wherein an additional PCIe link is to directly couple the at least one slot with a back panel I/O.

2. The architecture of claim 1, further including an additional PCIe link to directly couple the further slot with the network fabric to provide an additional communication path.

3. The architecture of claim 1, further including:
at least two slots that accommodate a respective processor module, wherein the network fabric is to be utilized when the respective processor modules communicate across respective PCIe links directly coupling each of the at least two slots with the network fabric; and
at least two slots that accommodate a respective processor module, wherein the network fabric is to be bypassed when the respective processor modules communicate across respective further PCIe links directly coupling each of the at least two slots with a bridge external to the network fabric.

4. The architecture of claim 1, further including one or more of:
the further PCIe link is to directly couple a slot that accommodates a processor module with a slot that accommodates an I/O module, wherein the network fabric is to be bypassed when the processor module and the I/O module communicate across the further PCIe link; or
the further PCIe link includes a dual star PCIe link to directly couple four slots with each other, wherein the network fabric is to be bypassed when at least two hardware modules communicate across the dual star PCIe link.

5. The architecture of claim 1, further including one or more of:
a user specific I/O to provide user defined functionality; or
a management element to provide management functionality.

6. The architecture of claim 1, wherein the hardware module includes one or more of:
a processor module;
a storage module;
a networking module;
a security module;
a switch module;
a micro-server module;
a PCIe module;
a graphics module; or
a general purpose I/O card.

7. The architecture of claim 1, further including one or more of:
a chassis including the surface defining the slot, wherein the chassis includes a standard size corresponding to a rack specification;
a form factor specific off the shelf module; or
a form factor specific user defined module.

8. The architecture of claim 1, further including a backboard including one or more of:
a dynamic function backboard; or
a fixed function backboard.

9. A method comprising:
providing a surface defining a slot to accommodate a hardware module, and
providing a peripheral component interconnect express (PCIe) fabric between the slot and a network fabric, wherein the PCIe fabric includes:
a peripheral component interconnect express (PCIe) link directly coupling the slot with the network fabric to provide a communication path including the network fabric, wherein the slot accommodates a hardware module; and
a further PCIe link to couple the slot with a further slot to provide a communication path excluding the network fabric, wherein the further slot accommodates a further hardware module: and
providing one or more of:
a one rack unit implementation, wherein at least one slot accommodates a respective processor module, and wherein an additional PCIe link directly couples the at least one slot with a back panel input/output (I/O);
a two rack unit implementation, wherein at least one slot accommodates a respective processor module, and wherein an additional PCIe link directly couples the at least one slot with a back panel I/O; or
a four rack unit implementation, wherein at least one slot accommodates a respective processor module, and wherein an additional PCIe link directly couples the at least one slot with a back panel I/O.

10. The method of claim 9, further including:
providing at least two slots that accommodate a respective processor module, wherein the network fabric is utilized when the respective processor modules communicate across respective PCIe links directly coupling each of the at least two slots with the network fabric; and
providing at least two slots that accommodate a respective processor module, wherein the network fabric is bypassed when the respective processor modules communicate across respective further PCIe links directly coupling each of the at least two slots with a bridge external to the network fabric.

11. The method of claim 9, further including one or more of:
providing the further PCIe link directly coupling a slot that accommodates a processor module with a slot that accommodates an I/O module, wherein the network fabric is bypassed when the processor module and the I/O module communicate across the further PCIe link; or
providing the further PCIe link including a dual star PCIe link directly coupling four slots with each other, wherein the network fabric is bypassed when at least two hardware modules communicate across the dual star PCIe link.

12. The method of claim 9, further including one or more of:
providing a user specific I/O to provide user defined functionality; or
providing a management element to provide management functionality.

13. The method of claim 9, further including one or more of:
providing a chassis including the surfaces defining the slot, wherein the chassis includes a standard size corresponding to a rack implementation;
providing a form factor specific off the shelf module;
providing a form factor specific user defined module; or
providing a backboard including one or more of a dynamic function backboard or a fixed function backboard.

14. At least one non-transitory computer-readable medium comprising one or more instructions that when executed on a computing device cause the computing device to:
provide a peripheral component interconnect express (PCIe) fabric between a slot and a network fabric, wherein the PCIe fabric is to include:
a PCIe link to directly couple the slot defined by a surface with the network fabric to provide a communication path including the network fabric, wherein the slot is to accommodate a hardware module; and a further PCIe link to couple the slot with a further slot to provide a communication path excluding the network fabric, wherein the further slot is to accommodate a further hardware module; and provide one or more of:
a one rack unit implementation, wherein at least one slot accommodates a respective processor module, and wherein an additional PCIe link directly couples the at least one slot with a back panel input/output (I/O);
a two rack unit implementation, wherein at least one slot accommodates a respective processor module, and wherein an additional PCIe link directly couples the at least one slot with a back panel I/O; or
a four rack unit implementation, wherein at least one slot accommodates a respective processor module, and wherein an additional PCIe link directly couples the at least one slot with a back panel I/O.

15. The at least one medium of claim 14, wherein when executed the one or more instructions cause the computing device to:
provide at least two slots that accommodate a respective processor module, wherein the network fabric is to be utilized when the respective processor modules communicate across respective PCIe links directly coupling each of the at least two slots with the network fabric; and
provide at least two slots that accommodate a respective processor module, wherein the network fabric is to be bypassed when the respective processor modules communicate across respective further PCIe links directly coupling each of the at least two slots with a bridge external to the network fabric.

16. The at least one medium of claim 14, wherein when executed the one or more instructions cause the computing device to:
provide the further PCIe link to directly couple a slot that accommodates a processor module with a slot that accommodates an I/O module, wherein the network fabric is to be bypassed when the processor module and the I/O module communicate across the further PCIe link; or
provide the further PCIe link including a dual star PCIe link to directly couple four slots with each other, wherein the network fabric is to be bypassed when at least two hardware modules communicate across the dual star PCIe link.

17. The at least one medium of claim 14, wherein when executed the one or more instructions cause the computing device to:
provide a user specific I/O to provide user defined functionality; or
provide a management element to provide management functionality.

18. The at least one medium of claim 14, wherein when executed the one or more instructions cause the computing device to:
provide a chassis including the surfaces defining the slot, wherein the chassis includes a standard size corresponding to a rack specification;
provide a form factor specific off the shelf module;
provide a form factor specific user defined module; or provide a backboard including one or more of a dynamic function backboard or a fixed function backboard.

19. An apparatus comprising:
a surface defining a slot to accommodate a hardware module, and
logic to,
provide a peripheral component interconnect express (PCIe) fabric between the slot and a network fabric, wherein the PCIe fabric is to include,
a PCIe link to directly couple the slot with the network fabric to provide a communication path including the network fabric, and
a further PCIe link to couple the slot with a further slot to provide a communication path excluding the network fabric, wherein the further slot is to accommodate a further hardware module and
provide one or more of,
a one rack unit implementation, wherein at least one slot accommodates a respective processor module, and wherein an additional PCIe link directly couples the at least one slot with a back panel input/output (I/O);
a two rack unit implementation, wherein at least one slot accommodates a respective processor module, and wherein an additional PCIe link directly couples the at least one slot with a back panel I/O: or
a four rack unit implementation, wherein at least one slot accommodates a respective processor module, and wherein an additional PCIe link directly couples the at least one slot with a back panel I/O.

20. The apparatus of claim 19, wherein the logic is to,
provide at least two slots that accommodate a respective processor module, wherein the network fabric is to be utilized when the respective processor modules communicate across respective PCIe links directly coupling each of the at least two slots with the network fabric, and
provide at least two slots that accommodate a respective processor module, wherein the network fabric is to be bypassed when the respective processor modules communicate across respective further PCIe links directly coupling each of the at least two slots with a bridge external to the network fabric.

21. The apparatus of claim 19, wherein the logic is to,
provide the further PCIe link to directly couple a slot that accommodates a processor module with a slot that accommodates an I/O module, wherein the network fabric is to be bypassed when the processor module and the I/O module communicate across the further PCIe link, or
provide the further PCIe link including a dual star PCIe link to directly couple four slots with each other, wherein the network fabric is to be bypassed when at least two hardware modules communicate across the dual star PCIe link.

22. The apparatus of claim 19, wherein the logic is to,
provide a chassis including the surfaces defining the slot, wherein the chassis includes a standard size corresponding to a rack specification,
provide a form factor specific off the shelf module,
provide a form factor specific user defined module, or
provide a backboard including one or more of a dynamic function backboard or a fixed function backboard.

* * * * *